(12) United States Patent
Kawanishi et al.

(10) Patent No.: US 8,908,976 B2
(45) Date of Patent: Dec. 9, 2014

(54) IMAGE INFORMATION PROCESSING APPARATUS

(75) Inventors: Ryouichi Kawanishi, Kyoto (JP); Tsutomu Uenoyama, Osaka (JP); Tomohiro Konuma, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 104 days.

(21) Appl. No.: 13/696,662

(22) PCT Filed: Apr. 15, 2011

(86) PCT No.: PCT/JP2011/002235
§ 371 (c)(1),
(2), (4) Date: Nov. 7, 2012

(87) PCT Pub. No.: WO2011/148562
PCT Pub. Date: Dec. 1, 2011

(65) Prior Publication Data
US 2013/0058579 A1     Mar. 7, 2013

(30) Foreign Application Priority Data

May 26, 2010 (JP) ................. 2010-120613

(51) Int. Cl.
| | | |
|---|---|---|
| G06K 9/00 | (2006.01) | |
| G06K 9/48 | (2006.01) | |
| G06F 17/30 | (2006.01) | |
| G06K 9/32 | (2006.01) | |

(52) U.S. Cl.
CPC ...... G06K 9/00228 (2013.01); G06F 17/30256 (2013.01); G06F 17/30247 (2013.01); G06K 9/32 (2013.01)
USPC ............................ 382/195; 382/118; 382/197

(58) Field of Classification Search
CPC ....... G06T 7/0081; G06T 7/004; G06T 9/008; G06T 2207/30196; G06T 2207/30201; G06F 17/30256; G06F 17/30247; G06K 9/32; G06K 9/62; G06K 9/46; G06K 9/00221; G06K 9/00268
USPC ......... 382/195, 100, 103, 197, 118, 115, 224, 382/190
See application file for complete search history.

(56) References Cited

U.S. PATENT DOCUMENTS 8,027,541 B2 *  9/2011  Hua et al. ................. 382/190
8,369,570 B2 *  2/2013  Myers et al. .............. 382/103
(Continued)

FOREIGN PATENT DOCUMENTS

| | | |
|---|---|---|
| CN | 1908936 | 2/2007 |
| EP | 1223551 | 7/2002 |

(Continued)

OTHER PUBLICATIONS

International Search Report issued Jun. 28, 2011 in corresponding International Application No. PCT/JP2011/002235.

(Continued)

Primary Examiner — Sheela Chawan
(74) Attorney, Agent, or Firm — Wenderoth, Lind & Ponack, L.L.P.

(57) ABSTRACT

An image information processing apparatus comprising: an extraction unit that extracts an object from a photographed image; a calculation unit that calculates an orientation of the object as exhibited in the image; and a provision unit that provides a tag to the image according to the orientation of the object.

16 Claims, 36 Drawing Sheets

(56) References Cited

U.S. PATENT DOCUMENTS

| | | | |
|---|---|---|---|
| 8,593,542 B2* | 11/2013 | Steinberg et al. | 348/239 |
| 2002/0093670 A1 | 7/2002 | Luo et al. | |
| 2006/0274978 A1 | 12/2006 | Fukuda et al. | |
| 2007/0183663 A1 | 8/2007 | Wang et al. | |
| 2007/0201749 A1 | 8/2007 | Yamauchi et al. | |
| 2009/0304289 A1 | 12/2009 | Karimoto et al. | |
| 2010/0079613 A1 | 4/2010 | Karimoto et al. | |
| 2010/0235400 A1* | 9/2010 | Myers et al. | 707/802 |
| 2013/0058579 A1* | 3/2013 | Kawanishi et al. | 382/195 |

FOREIGN PATENT DOCUMENTS

| | | |
|---|---|---|
| JP | 2002-245471 | 8/2002 |
| JP | 2003-87815 | 3/2003 |
| JP | 2004-297305 | 10/2004 |
| JP | 2006-350552 | 12/2006 |
| JP | 2007-41987 | 2/2007 |
| JP | 2008-250444 | 10/2008 |
| JP | 2009-526495 | 7/2009 |
| JP | 2009-200900 | 9/2009 |
| JP | 2009-290255 | 12/2009 |
| JP | 2010-16796 | 1/2010 |
| JP | 2010-16878 | 1/2010 |
| JP | 2010-87572 | 4/2010 |
| JP | 2010-148132 | 7/2010 |
| WO | 2006/082979 | 8/2006 |
| WO | 2007/092905 | 8/2007 |

OTHER PUBLICATIONS

Laurent ITTI et al., "A saliency-based search mechanism for overt and covert shifts of visual attention", Vision Research, Jun. 2000, vol. 40, Issues 10-12, pp. 1489-1506.

Google, "Add name tags in Picasa Web Albums", [Online], Available:http://picasa.google.com/support/bin/answer.py?hl=jp &answer=93973, Sep. 27, 2011.

Laurent ITTI et al., "A Model of Saliency-based Visual Attention for Rapid Scene Analysis", IEEE, vol. 20, No. 11, pp. 1254-1259, Nov. 1998.

Yuji Yamauchi et al., "People detection based on co-occurrence of appearance and spatio-temporal features", National Institute of Informatics Transactions on Progress in Informatics, No. 7, pp. 33-42, Jan. 13, 2010.

Hironobu Fujiyoshi, "Gradient-Based Feature Extraction -SIFT and HOG-", Information Processing Society of Japan, Research Paper CVIM160, pp. 211-224, Aug. 27, 2007 (with English translation).

Office Action issued Sep. 17, 2014 in corresponding Chinese Patent Application No. 201180025428.6 (with partial English translation).

* cited by examiner

Values indicate angles

| Image name | Attention vector information ||||||
|---|---|---|---|---|---|---|
| | Attention vector 1 ||| Attention vector 2 |||
| | Type | Magnitude | Area | Type | Magnitude | Area |
| Image A | Face-C | 0.23 | Area 1 (O1-O4) | Face-A | 0.11 | Area 2 (O5-O8) |
| Image B | Person-b | 0.15 | Area 1 (O1 and O2) | None | — | — |
| Image C | None | — | — | — | — | — |
| Image D | Face-D | 0.2 | Area 1 (O1) | None | — | — |
| ⋮ | ⋮ | ⋮ | ⋮ | ⋮ | ⋮ | ⋮ |

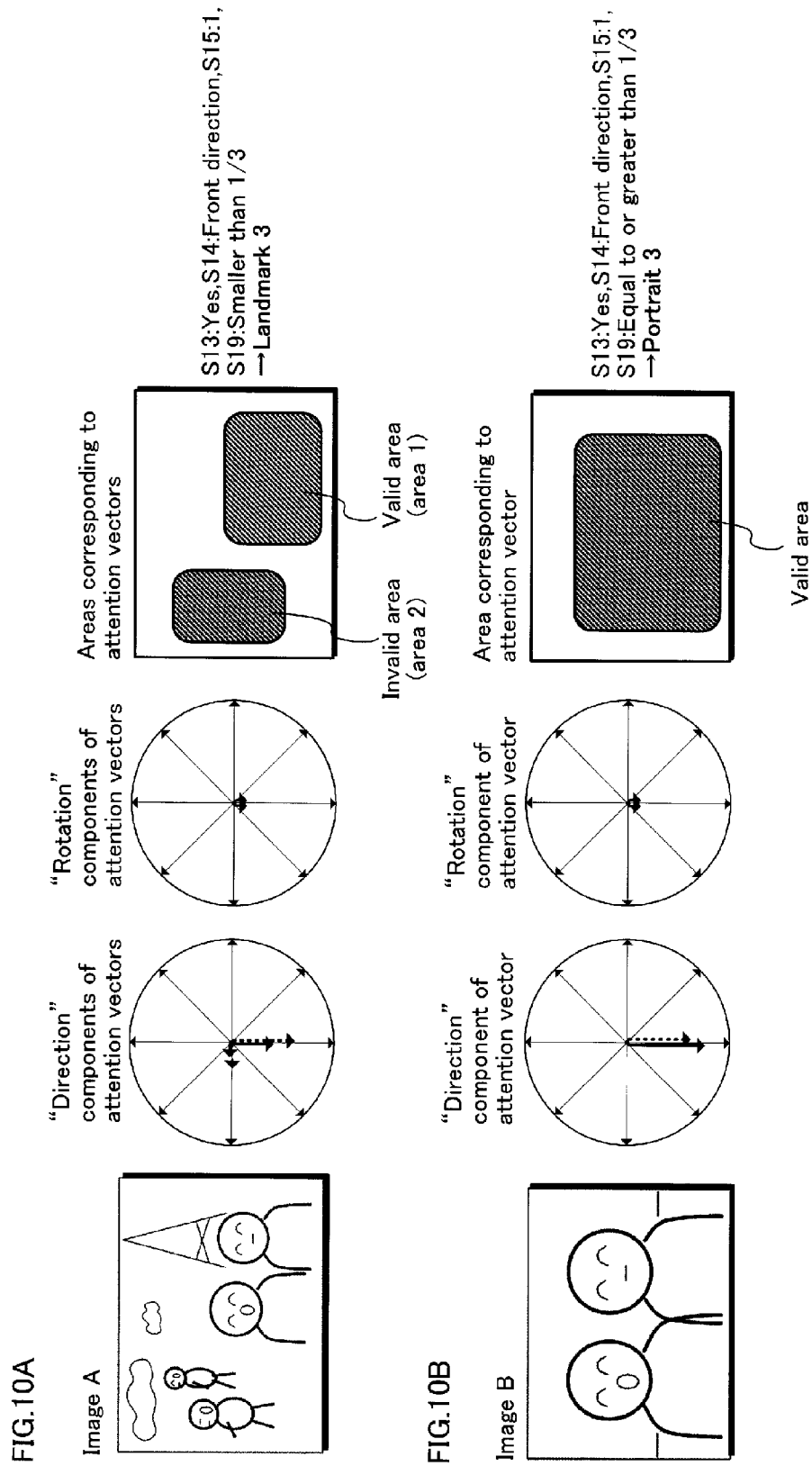

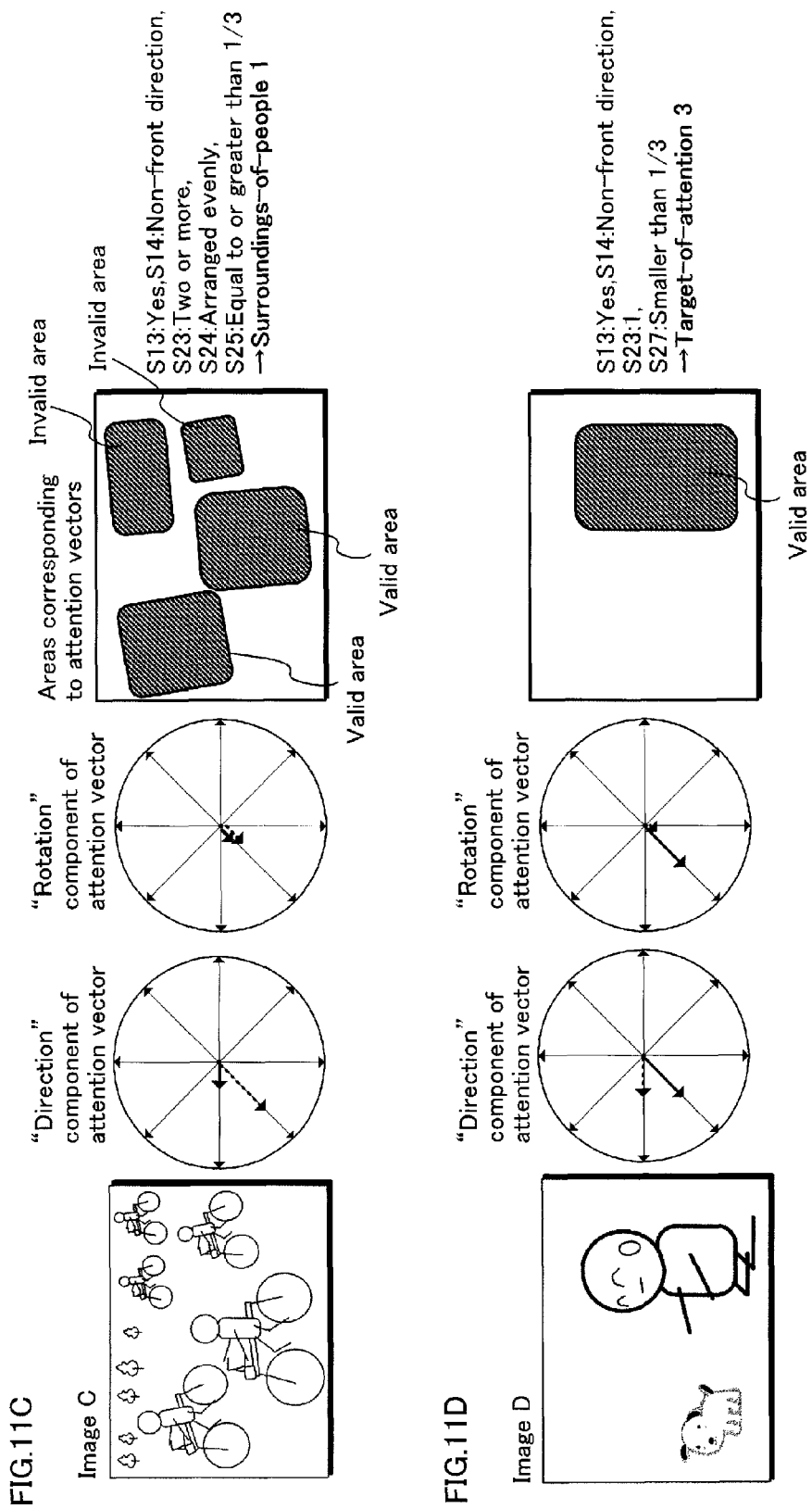

FIG.12

| Tag | Alternative name | Icon |
|---|---|---|
| Portrait 1 | Lined-up group photo |  |
| Portrait 2 | Not lined-up group photo |  |
| Portrait 3 | Individual person photo |  |
| Landmark 1 | Panoramic group photo | 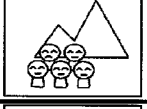 |
| Landmark 2 | Panoramic individual group photo | 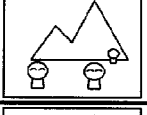 |
| Landmark 3 | Panoramic individual photo |  |
| Surroundings-of-people 1 | Person attention photo | 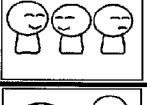 |
| Surroundings-of-people 2 | Not lined-up attention photo |  |
| Surroundings-of-people 3 | Individual person attention photo | 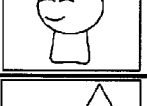 |
| Target-of-attention 1 | Panoramic attention photo | 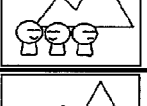 |
| Target-of-attention 2 | Panoramic individual attention photo |  |
| Target-of-attention 3 | Individual attention photo | 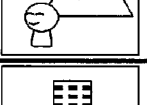 |
| Urban landscape | Urban landscape | 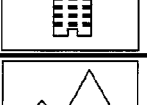 |
| Natural landscape | Natural landscape |  |

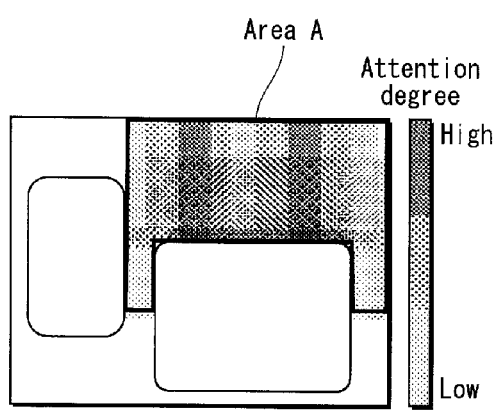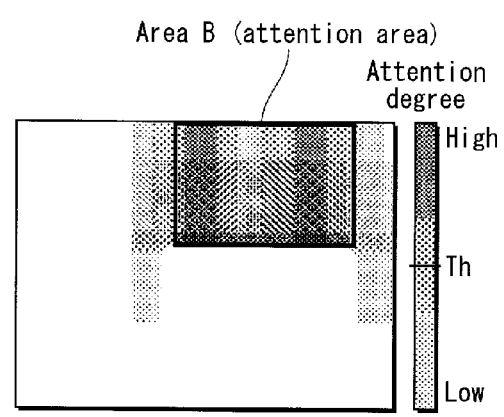

Area C
(attention area)

Image K

Attention vectors in image K
when viewed from above

Image L        Area E (convergence area)

Area E (convergence area)

Location of convergence

IMAGE INFORMATION PROCESSING APPARATUS

BACKGROUND OF INVENTION

1. Technical Field

The present invention relates to a technology for assisting provision of classification tags to images.

2. Background Art

Due to the recent spread in DSCs (Digital Still Cameras), users are able to take photographs without much concern. Due to this, the number of images owned by a single user is increasing and reaching an enormous amount. Under such a situation, a technology for assisting provision of tags to images, which enables users to efficiently search for desired images, is attracting much attention.

Non-Patent Literature 1 discloses a technology of detecting multiple faces appearing in multiple images, classifying the detected faces into groups according to similarity between the faces, and adding name tags to faces classified into a given group at once.

CITATION LIST

Patent Literature

[Patent Literature 1]
Japanese Patent Application Publication (Translation of PCT Application) No. 2009-526495
[Patent Literature 2]
Japanese Patent Application Publication No. 2009-290255
[Patent Literature 3]
Japanese Patent Application Publication No. 2010-16796
[Patent Literature 4]
Japanese Patent Application Publication No. 2008-250444

Non-Patent Literature

[Non-Patent Literature 1]
Google, "Add name tags in Picasa Web Albums", [Online], Available: http://picasa.google.com/support/bin/answer.py?hl=jp&answer=93973, viewed 2010 Apr. 27
[Non-Patent Literature 2]
Laurent Itti, Christof Koch, Ernst Niebur, "A Model of Saliency-based Visual Attention for Rapid Scene Analysis", IEEE, Vol. 20, No. 11, pp. 1254-1259, 1998
[Non-Patent Literature 3]
Yuji Yamauchi, Hironobu Fujiyoshi, Yuji Iwahori, and Takeo Kanade, "People Detection Based on Co-occurrence of Appearance and Spatio-temporal Features", National Institute of Informatics Transactions on Progress in Informatics, No. 7, pp. 33-42, 2010

SUMMARY OF INVENTION

When applying conventional technology, a tag is provided to an image while focusing on a face of a person appearing in the image such that, for instance, when a given user identified as "person A" appears in the image, the image is provided with a tag "person A".

In this sense, the application of conventional technology realizes provision, to an image, of a tag identifying a person appearing in the image. However, conventional technology does not suffice when it is desired to provide, to an image, a tag that accurately indicates a classification to which the image itself belongs and not a tag that indicates a classification to which a person appearing in the image belongs.

In the meantime, the inventors of the present invention have found through much consideration that an orientation of a person appearing in an image, when utilized in an efficient manner, is the key for realizing the provision of appropriate tags to images.

For instance, in a portrait-type image, it is very likely that a person appearing in the image faces the direction of the camera (referred to hereinafter as a "front direction" in an image). In addition, in an image photographed at a scene of a party where many people are gathering around, it is very likely that people appearing in the image face directions of the people that they are talking to and the like (directions other than the direction of the camera).

In view of the above, the present invention provides an image information processing device that realizes provision of an appropriate tag to an image by focusing on an orientation of an object such as a person appearing in the image.

One aspect of the present invention is an image information processing apparatus comprising: an extraction unit that extracts an object from a photographed image; a calculation unit that calculates an orientation of the object as exhibited in the image; and a provision unit that provides a tag to the image according to the orientation of the object.

The image information processing apparatus pertaining to one aspect of the present invention realizes provision of an appropriate tag to an image by focusing on an orientation of an object such as a person appearing in the image.

BRIEF DESCRIPTION OF THE DRAWINGS

FIG. 10A illustrates the attention vectors and the like of image A, and FIG. 10B illustrates attention vectors and the like of image B.

FIG. 11C illustrates attention vectors and the like of image C, and FIG. 11D illustrates attention vectors and the like of image D.

FIG. 12 illustrates examples of tags, alternative names of the tags, and icons indicating the tags.

FIG. 17A illustrates a total attention degree map for image A, and FIG. 17B illustrates an attention area in image A.

DETAILED DESCRIPTION OF INVENTION

Embodiment 1

Figure 1:
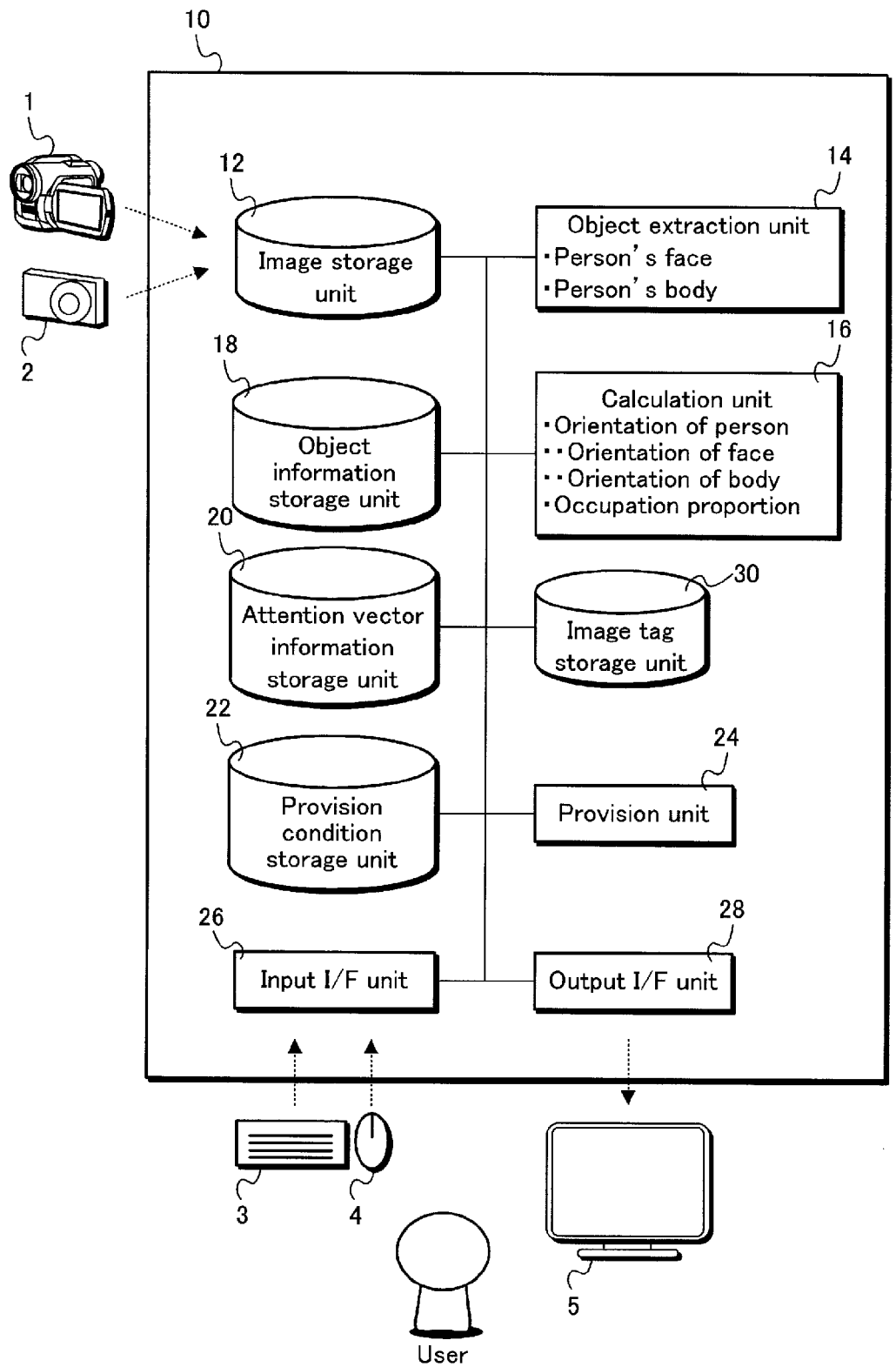
FIG. 1 is a functional block diagram of an image information processing apparatus 10.

As illustrated in FIG. 1, an image information processing apparatus 10 includes: an image storage unit 12; an object extraction unit 14; a calculation unit 16; an object information storage unit 18; an attention vector information storage unit 20; a provision condition storage unit 22; a provision unit 24; an input I/F (interface) unit 26; an output I/F unit 28; and an image tag storage unit 30. Each of the storage units included in the image information processing apparatus 10, namely the image storage unit 12, the object information storage unit 18, the attention vector information storage unit 20, the provision condition storage unit 22, and the image tag storage unit 30 is composed of hardware such as an HDD (Hard Disk Drive) and a RAM (Random Access Memory). In addition, a conventional PC (personal computer) may be used as the image information processing apparatus 10.

The image storage unit 12 stores therein a plurality of images.

Figure 2:
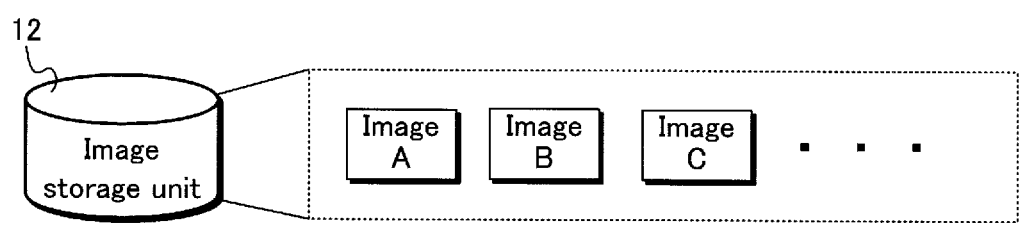
FIG. 2 illustrates contents stored in an image storage unit 12.

Description is provided on contents stored in the image storage unit 12, with reference to FIG. 2.

The image storage unit 12 stores a large number of images (for instance, several thousand images) such as "image A", "image B", "image C" and so on, as illustrated in FIG. 2.

Such images are managed by a user for in-home use. For instance, each of such images is an image (a frame image) included in a moving image shot by the user with use of a digital movie camera 1, an image shot by the user with use of a DSC (Digital Still Camera) 2, or the like.

In the following, description continues on the functional blocks of the image information processing apparatus 10.

The object extraction unit 14 extracts one or more objects from an image stored in the image storage unit 12. Here, each of the one or more objects extracted from the image is a body of a person appearing in the image or a face of a person appearing in the image. Further, note that when an object extracted from the image is a body of a person appearing in the image, the object includes the entirety of the person's body, and includes his/her face (head), torso, and limbs. In addition, a method may be adopted of extracting from the image, as an object of a body of a person appearing in the image, only the upper half of the person's body, instead of extracting the entirety of the person's body.

Conventional methods can be utilized for the extraction of objects from an image.

For instance, the method of extraction disclosed in Patent Literature 4 (Japanese Patent Application Publication No. 2008-250444) may be utilized for recognition and extraction of a person's face in an image. Further, in addition to performing extraction and recognition of a person's face in an image, classification of the face may be performed such that the face is classified into one of different types of faces.

Further, the method disclosed in Non-Patent Literature 3 may be utilized for recognition and extraction of a person's body in an image.

The calculation unit 16 calculates a proportion of an area of the image occupied by a person's face or a person's body extracted from the image (hereinafter referred to as an occupation proportion).

Further, the calculation unit 16 calculates a rotation and an orientation of the person's face or person's body extracted from the image according to information pertaining to the person extracted by the object extraction unit 14.

Further, the calculation unit 16 stores the results of the calculation to the object information storage unit 18.

In the following, description is provided on an overall flow of processing performed by the object extraction unit 14 and the calculation unit 16.

Figure 3:
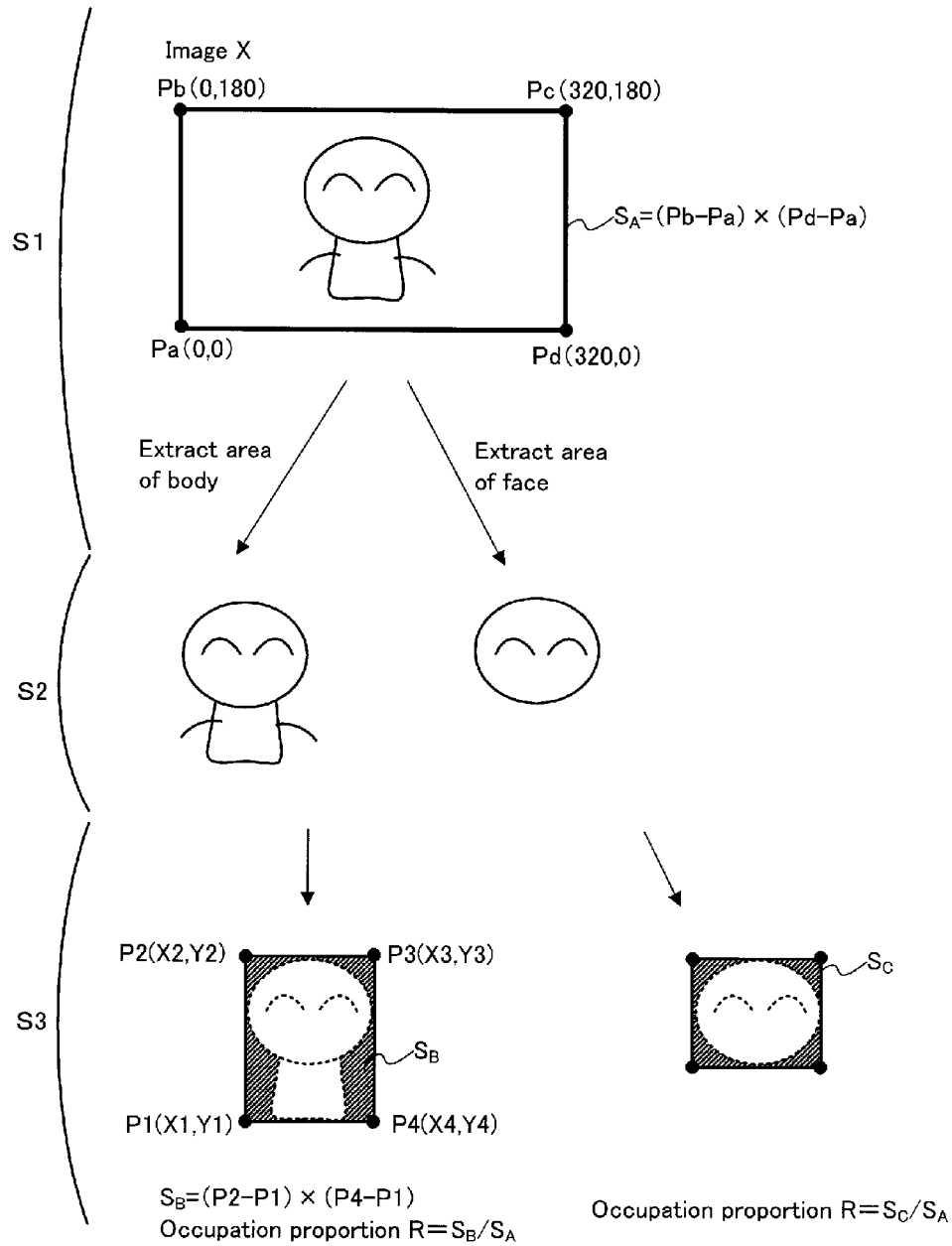
FIG. 3 illustrates an overall flow of processing performed by an object extraction unit 14 and a calculation unit 16.

Here, presumption is made that image X illustrated in FIG. 3, in which one person appears, is the target of the extraction and the calculation. The object extraction unit 14 extracts, from image X, the person's face and the person's body (S1).

Subsequently, the calculation unit 16 calculates a rotation and an orientation of each of the person's face and the person's body (S2).

Further, the calculation unit 16 calculates an occupation proportion of the person's body in image X by dividing an area ($S_B$) of a rectangular area in image X surrounding the person's body by an entire area ($S_A$) of image X (S3). Similarly, the calculation unit 16 calculates an occupation proportion of the person's face in image X by dividing an area ($S_C$) of a rectangular region in image X surrounding the person's face by the entire area ($S_A$) of image X (S3).

Finally, the calculation unit 16 calculates an attention vector according to a "rotation", an "orientation", an "occupation proportion", etc., of each of the objects (S4).

In the following, detailed description is provided on Step S2, in which the calculation unit 16 calculates an orientation and a rotation of a person's face in an image.

Figure 4:
FIG. 4 illustrates a table defining face rotation classes and face orientation classes.

The calculation unit 16 determines a rotation and an orientation of a person's face extracted from an image by the extraction unit 14 by comparing and matching the person's face with information defined in a table 17, which is as illustrated in FIG. 4.

The table 17 includes "rotation" 17*a* defining three face rotation classes into which the rotation of faces in images is classified. More specifically, the three face rotation classes defined in "rotation" 17*a* each indicate a range of angles at which a face in an image is rotationally tilted in a lateral direction. The three face rotation classes specified in "rotation" 17*a* are a: "−90°--25.5°", b: "−25.5°-25.5°", and c: "25.5°-90°". The table 17 also includes "orientation" 17*b* defining five face orientation classes into which the orientation of faces in images is classified. More specifically, the five face orientation classes defined in "orientation" 17*b* each indicate a range of angles towards which a face in an image is oriented. The five face orientation classes specified in "orientation" 17*b* are A: "−90°--67.5°", B: "−67.5°-25.5°", C: "−25.5°-25.5°", D: "25.5°-67.5°", and E: "67.5°-90°". In particular, when an orientation of a person's face in an image matches face orientation class C defined in "orientation" 17*b*, the person's face is specified as facing the front direction in the image.

As for the method for determining an orientation of a person's body in an image, the calculation unit 16 can utilize a method such as the following methods 1 and 2. According to method 1, the calculation unit 16 determines an orientation of a person's body in an image according to a direction of movement, which can be obtained from differences between frames in the person's appearance when the person is moving. According to method 2, the calculation unit 16 utilizes results of comparison and matching performed with respect to different models classified according to orientation.

The calculation unit 16 determines a face rotation class and a face orientation class to which a person's face in an image belongs according to a table based on the table 17. Further, the calculation unit 16 stores the face rotation class and the face orientation class to which the person's face belongs to the object information storage unit 18.

Figure 5:
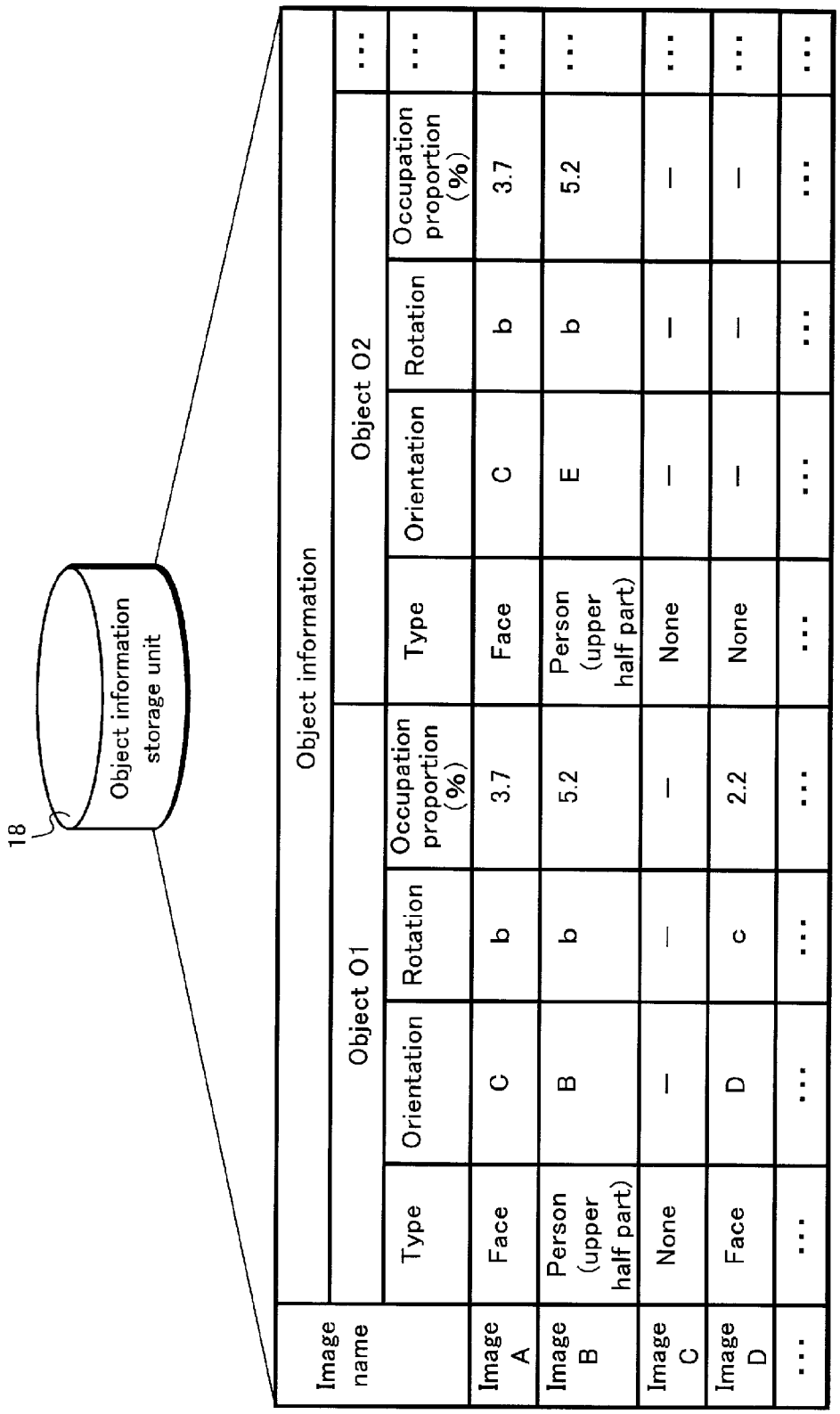
FIG. 5 illustrates contents stored in an object information storage unit 18.

As illustrated in FIG. 5, the object information storage unit 18 stores, for each of images, object information on each object appearing in the corresponding image. In specific, the object information includes the items: "type"; "orientation"; "rotation"; and "occupation proportion". More specifically, the object information on a given object indicates a type, an orientation, a rotation, and an occupation proportion of the object.

In specific, a value indicated in the item "type" for a given object indicates an object type to which the object corresponds to. For instance, values indicated in the item "type" include values such as "face" and "person (upper half part)". When the item "type" for a given object indicates "person (upper half part)", the object is the upper half part of a body of a person appearing in an image.

A value indicated in the item "orientation" for a given object indicates an orientation of the object in a corresponding image. In particular, when the item "type" indicates that the object is a person's face, the item "orientation" indicates a face orientation class in table 17 into which the face is classified. On the other hand, when the item "type" indicates that the object is a person's body, the item "orientation" indicates a body orientation class into which the body is classified.

A value indicated in the item "rotation" for a given object (a person's face) indicates a corresponding face rotation class in table 17 illustrated in FIG. 4 (on the other hand, when the item "type" indicates that the object is a person's body, a value indicated in the item "rotation" indicates a body rotation class into which the body is classified).

A value indicated in the item "occupation proportion" for a given object indicates, as description has been provided with reference to FIG. 3, a proportion of an area of an image including the object occupied by the object.

Figure 6A:
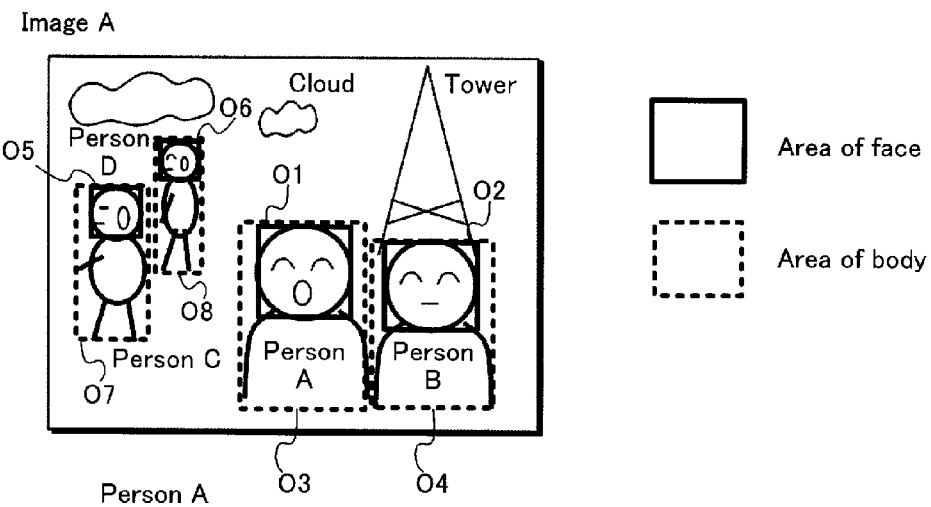
FIG. 6A illustrates image A.

FIG. 6A illustrates how objects are extracted from image A. Image A includes: two people (person A and person B) appearing in the right-hand side in the foreground; two people (person C and person D) appearing in the left-hand side; a tower; and clouds.

The object extraction unit 14 extracts a total of eight objects from image A, namely objects O1, O2, O5, O6, each of which is a face of a person appearing in image A, and body objects O3, O4, O7, O8, each of which is a body of a person appearing in image A. Note that in the present embodiment, description is provided under the premise that the object extraction unit 14 extracts, from an image, only objects pertaining to people appearing in the image and not non-human objects, such as a tower, appearing in the image.

The calculation unit 16 calculates a "type", an "orientation", a "rotation", and an "occupation proportion" of each of the eight objects extracted from image A.

For instance, as a result of the calculation by the calculation unit 16, it is determined that the "type" of object O1 is "face", the "orientation" of object O1 is "C", which indicates a face orientation class corresponding to the front direction, the "rotation" of object O1 is "b", which indicates a face rotation class indicating that a face exhibits no rotation in the corresponding image, and the "occupation proportion" of object O1 in image A is "3.7%". The calculation unit 16 stores the results of the calculation to the object information storage unit 18.

When an area of a person's body extracted from an image by the object extraction unit 14 includes an area of a person's face, the calculation unit 16 determines that the face and the body belong to the same person appearing in the image. For instance, in image A, the calculation unit 16 recognizes a combination of objects O1 and O3 as person A, a combination of objects O2 and O4 as person B, a combination of objects O5 and O7 as person C, and a combination of objects O6 and O8 as person D.

Following the recognition of people in an image, the calculation unit 16 sets areas with respect to the people having been recognized.

Here, the calculation unit 16 may set an area with respect to each person in an image. However, in the present embodiment, the calculation unit 16 sets an area with respect to a combination of people located at a close distance from each other in an image.

Figure 6B:
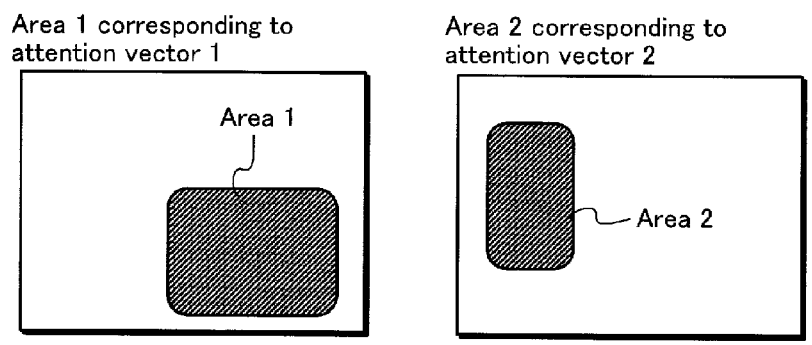
FIG. 6B illustrates areas in image A corresponding to attention vectors.

For instance, in image A illustrated in FIG. 6A, the distance between person A and person B is relatively small (for instance, the distance between person A and person B is equal to or smaller than 10 pixels). In such a case, the calculation unit 16 sets an area of image A occupied by the combination of person A and person B as "area 1". Similarly, the calculation unit 16 sets an area of image A occupied by the combination of person C and person D as "area 2". FIG. 6B illustrates "area 1" and "area 2".

After performing the setting of an area in an image, the calculation unit 16 obtains object information on an object included in the area from the object information storage unit 18 and calculates an attention vector according to an "orientation", a "rotation", and an "occupation proportion" of the object included in the object information obtained.

In specific, the calculation unit 16 calculates a direction component of an attention vector according to an "orientation" and an "occupation proportion" of the object. Further, the calculation unit 16 calculates a rotation component of the attention vector according to a "rotation" and an "occupation proportion" of the object.

For instance, in the example of image A illustrated in FIG. 6A, the calculation unit 16 obtains "orientations" ("C","C") of object O1 and object O2, each of which being an object of a person's face, from area 1 including the four objects O1 through O4. Accordingly, the calculation unit 16 calculates a vector $V_{O1,O2}$ for object O1 and object O2 having a "direction" C corresponding to the "orientations" ("C","C") of object O1 and object O2 and further, having a magnitude corresponding to "occupation proportions" ("3.7", "3.7") of object O1 and object O2 (refer to Math. 1 provided in the following for a specific formula used in the calculation).

Alternatively, the vector $V_{O1,O2}$ for object O1 and object O2 may be calculated by separately calculating two vectors, vector $V_{O1}$ for object O1 and vector $V_{O2}$ for object O2, and later combining the vectors $V_{O1}$ and $V_{O2}$.

In addition, the calculation of a magnitude of a vector for an object may be performed by using a matching accuracy of the object, in addition to an "occupation proportion" of the object. A matching accuracy of a given object is a value indicating accuracy of face recognition. In such a case, a vector for an object is calculated so as to have a great magnitude when the matching accuracy of the object indicates a great value (i.e., when the certainty of the object being a face is high).

In a similar manner as in the calculation of the vector $V_{O1,O2}$ for object O1 and object O2, the calculation unit 16 calculates, from area 1, a vector $V_{O3,O4}$ for object O3 and object O4, each of which being an object of a person's body.

Figure 6C:
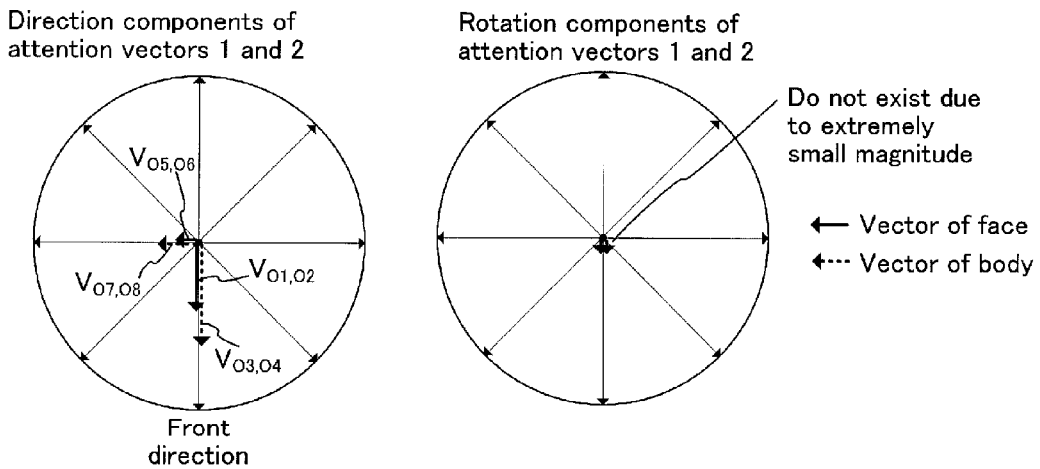
FIG. 6C illustrates the attention vectors.

FIG. 6C illustrates a direction component and a rotation component of each of attention vector 1 for area 1, which is composed of a combination of vectors $V_{O1,O2}$ and $V_{O3,O4}$, and attention vector 2 for area 2, which is composed of a combination of vectors $V_{O5,O6}$ and $V_{O7,O8}$. The attention vectors 1 and 2 are calculated by the calculation unit 16.

The direction components of attention vectors 1 and 2 illustrated in the left-hand side of FIG. 6C indicate directions when presuming that image A is viewed from directly above. As such, the bottom direction in FIG. 6C indicated by the direction components of vectors $V_{O1,O2}$ and $V_{O3,O4}$ corresponds to the front direction in image A.

In addition, as illustrated in the right-hand side of FIG. 6C, rotation components do not exist for attention vectors 1 and 2 since the magnitudes of the rotation components are extremely small in this case.

In the following, description is provided on an example of a formula utilized by the calculation unit 16 for the calculation of attention vectors.

In the following Math. 1, the number of objects is denoted as k; an occupation proportion of an object is denoted as $R_j$ [%], a direction component of a vector for the object is denoted as $D_k$ [°], the number of segments into which an attention vector is divided is denoted as i, the minimum angle in each segment is denoted as $Mi_j$, and the maximum angle in each segment is denoted as $Ma_j$.

[Math. 1]

$$\text{if } Mi_j \le D_k < Ma_i \; f_k = 1, \text{ else } f_k = 0,$$

$$F(i) = \sum_{j=1}^{k} f_j \times R_j$$

(Math. 1)

A magnitude F(i) of an attention vector can be calculated according to Math. 1.

Figure 7:
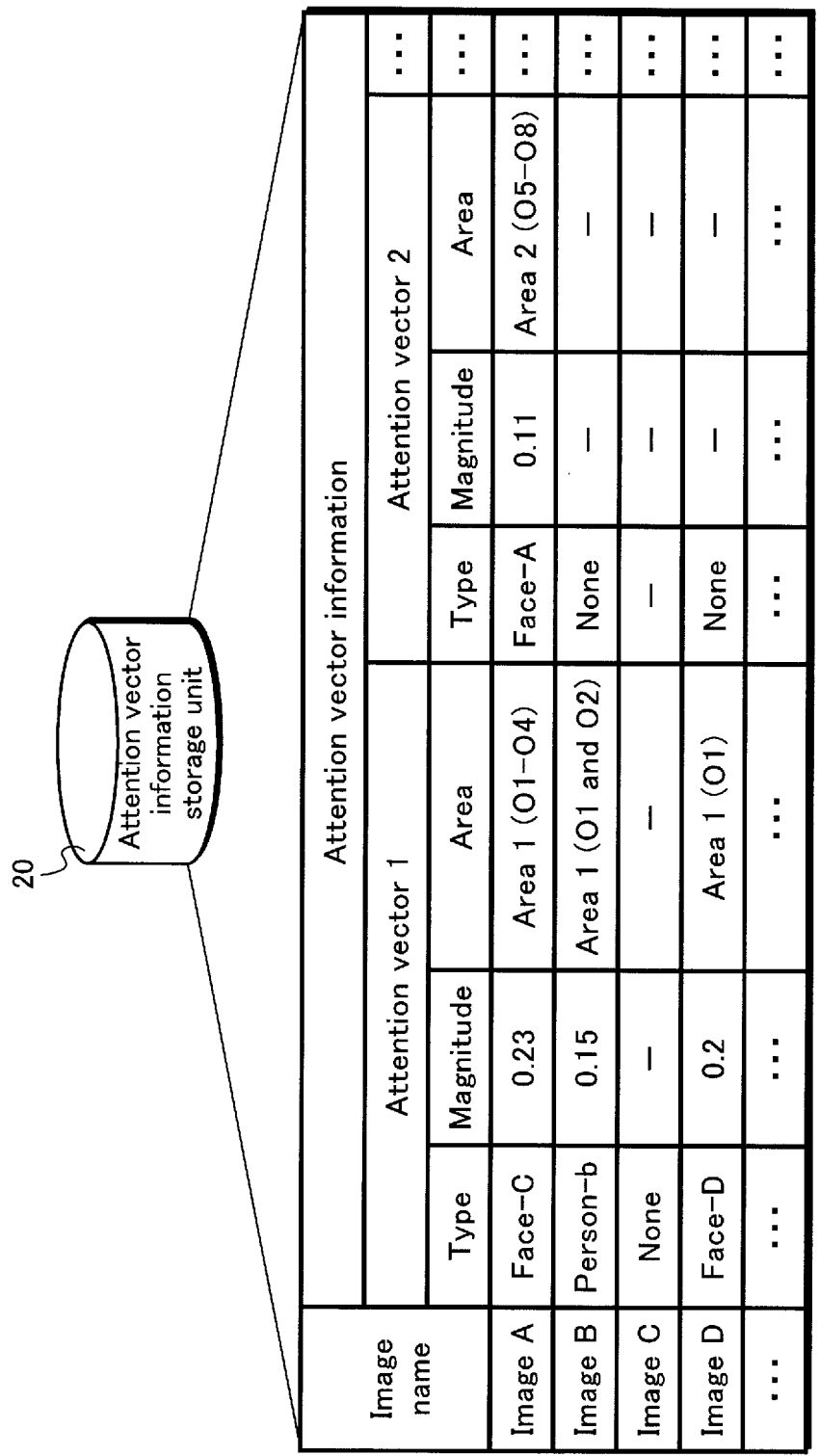
FIG. 7 illustrates contents stored in an attention vector information storage unit 20.

FIG. 7 illustrates contents stored in the attention vector information storage unit 20.

As illustrated in FIG. 7, the attention vector information storage unit 20 stores, for each image, information on each attention vector included in the corresponding image. In specific, the information includes the items: "type"; "magnitude"; and "area". A value indicated in the item "type" for a given attention vector indicates a type of the attention vector, a value indicated in the item "magnitude" for a given attention vector indicates a magnitude of the attention vector, and a value indicated in the item "area" for a given attention vector indicates an area in the image whose occupation proportion has been used to in the calculation of the attention vector.

In the following, description continues on the functional blocks of the image information processing apparatus 10, with reference to FIG. 1.

The provision condition storage unit 22 stores conditions relating to the provision of a tag to an image. In specific, the provision condition storage unit 22 stores the following Conditions 1 through 5 and the names of the tags to be provided to images fulfilling certain combinations of the conditions. Note that Conditions 1 through 5, explanation of which is provided in the following, are mere examples of the conditions relating to the provision of a tag to an image, and branching conditions and the like may be altered as necessary.

(1) Condition 1 concerns whether or not an attention vector in an image has a magnitude equal to or greater than a predetermined value (e.g., equal to or greater than 0.10). When an image includes multiple attention vectors, Condition 1 is fulfilled when at least one attention vector has a magnitude equal to or greater than the predetermined value.

(2) Condition 2 concerns whether a direction of an attention vector in an image indicates, in the image, the front direction or a direction other than the front direction (also referred to hereinafter as a non-front direction).

(3) Condition 3 concerns whether an image has two or more areas or only one area having a size equal to or greater than a predetermined size. Note that here, a size of an area in an image is indicated by a magnitude of an attention vector corresponding to the area, and when the magnitude of the attention vector corresponding to the area is equal to or greater than a predetermined value (e.g., equal to or greater than 0.15), the area is counted as a valid area.

For instance, in image A illustrated in FIG. 7, the magnitude of attention vector 1 corresponding to area 1 indicates 0.23 (≥0.15). Accordingly, area 1 is determined as a valid area.

In contrast, the magnitude of attention vector 2 corresponding to area 2 indicates 0.11 (<0.15). Accordingly, area 2 is not determined as a valid area.

(4) Condition 4 concerns, in an image having two or more areas having sizes equal to or greater than the predetermined size and therefore fulfilling Condition 3, whether objects are arranged evenly or unevenly in the image. For instance, when the unevenness between sizes of two or more objects in an image is within a predetermined range, the two or more objects are determined as being arranged evenly, and the image is determined as fulfilling Condition 4. In particular, when three or more objects are included in an image, the three or more objects are determined as being arranged evenly when the three or more objects are arranged at nearly equal intervals.

(5) Condition 5 concerns whether an object included in a valid area in an image (an area of the image that is counted as a valid area according to Condition 3) is an object pertaining to a person appearing in the image or an object pertaining to a background of the image. Here, determination is made that an object included in a valid area is an object pertaining to a person when an occupation proportion of the valid area in the image is equal to or greater than ⅓ (i.e., equal to or greater than approximately 33%). In contrast, determination is made that an object included in a valid area is an object pertaining to the background of the image when the occupation proportion of the valid area in the image is smaller than ⅓. Note that when an image includes multiple valid areas, a determination is made of whether or not a value obtained by adding the occupation proportions of the multiple valid areas is equal to or greater than ⅓.

The provision unit 24 compares and matches the attention vector information stored in the attention vector information storage unit 20 with the contents stored in the provision condition storage unit 20, and thereby provides a tag to each image.

A conventional method may be utilized as the method according to which the provision unit 24 provides a tag to an image. For instance, the provision unit 24 may associate an image with information indicating a tag provided thereto and may store the image and the information to the image tag storage unit 30. However, the method according to which the provision unit 24 provides a tag to an image is not limited to this, and the provision unit 24 may provide a tag to an image by directly writing the tag in the Exif (Exchangeable Image File Format) data of the image.

The input I/F unit 26 receives input from conventional input devices such as a keyboard 3 and a mouse 4.

The output I/F unit 28 causes a display 5 to perform various forms of displaying.

Figure 8:
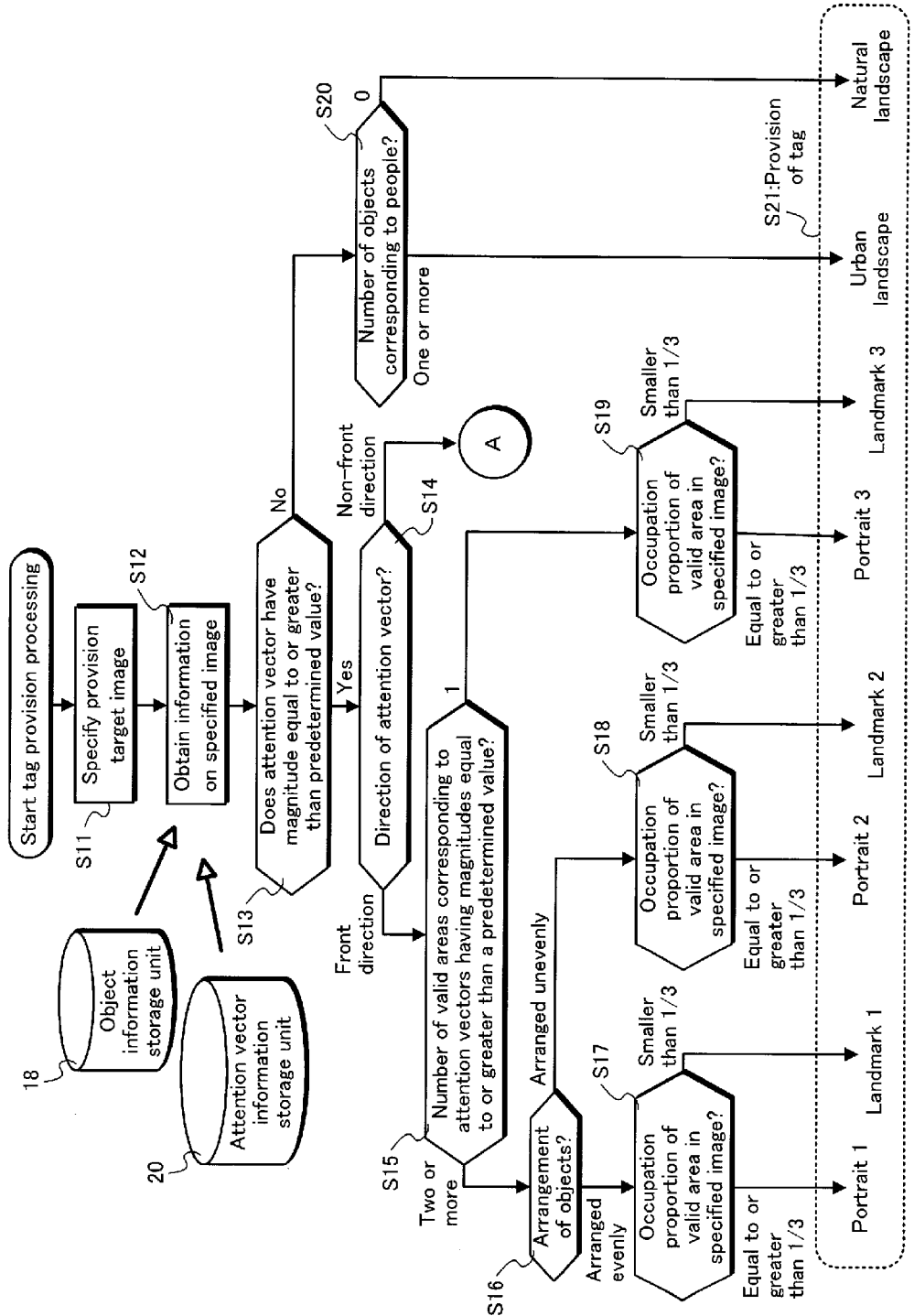
FIG. 8 is a flowchart illustrating a flow of tag provision processing.
Figure 9:
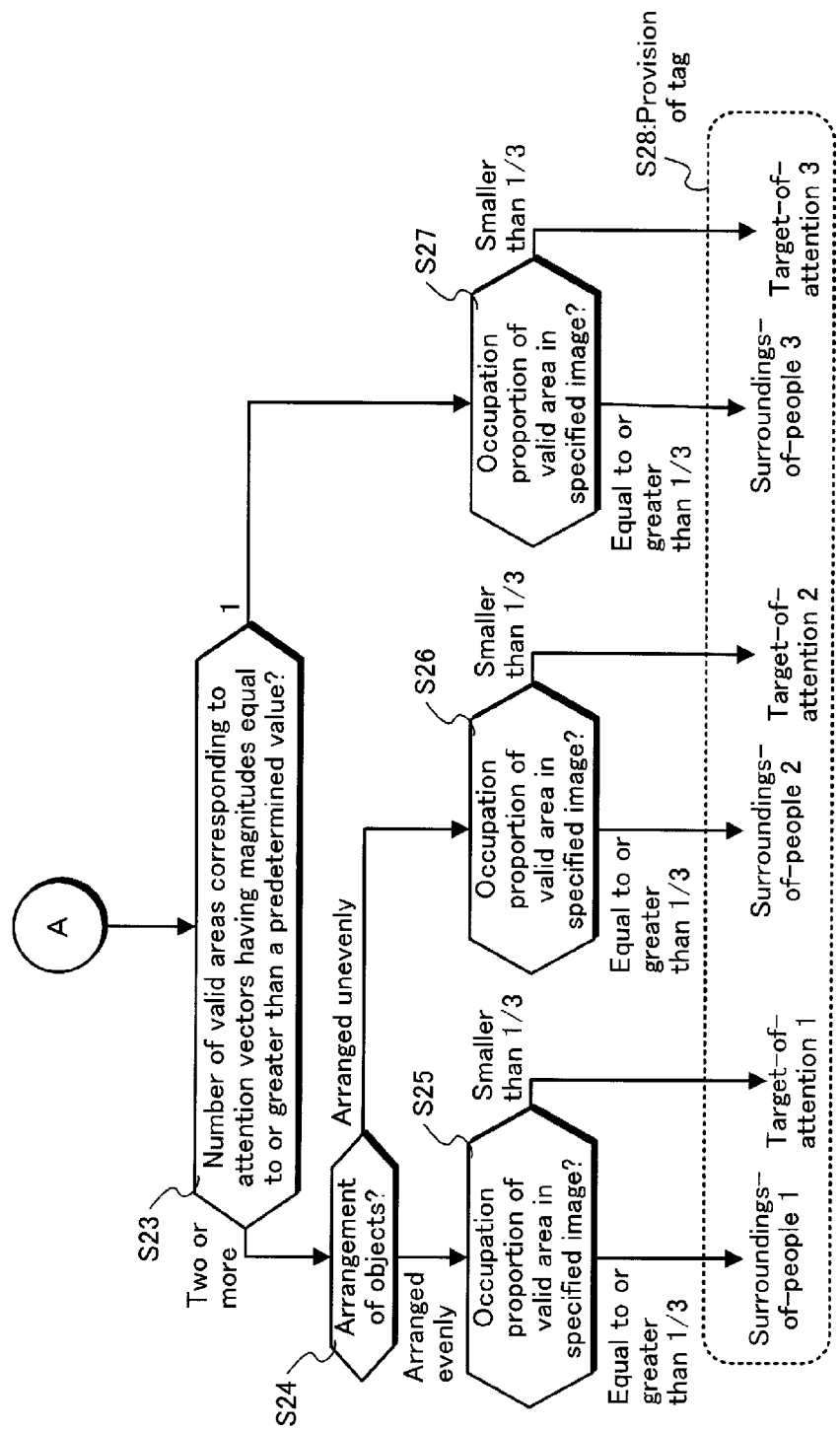
FIG. 9 is a flowchart illustrating the flow of the tag provision processing.

Subsequently, description is provided on a flow of operations performed by the image information processing apparatus 10 in the provision of a tag to an image, with reference to FIGS. 8 and 9. Here, note that the processing in each of the steps illustrated in FIGS. 8 and 9 is basically performed by the provision unit 24.

First, the provision unit 24 specifies an image (referred to hereinafter as a tagging target image) to which a tag is to be provided (S11). The specification of the tagging target image may be performed by causing the output I/F unit 28 to display a menu or the like on the display 5 and thereby receiving input from a user via the input I/F unit 26. Alternatively, the specification of the tagging target image may be performed such that, when a new image is added to the image storage unit 12, the newly added image is automatically specified as the tagging target image.

Following the specification of a tagging target image, the provision unit 24 obtains information on the tagging target image from the attention vector information storage unit 20 (S12). For instance, when image A has been specified as the tagging target image, the provision unit 24 obtains information on attention vectors 1 and 2 (refer to FIG. 7) included in image A.

Successively, the provision unit 24 determines whether or not a magnitude of an attention vector in the tagging target image is equal to or greater than a predetermined value (i.e., equal to or greater than 0.1) (S13). The determination in Step S13 is performed to determine existence/non-existence of attention in the tagging target image.

When determining that a magnitude of an attention vector in the tagging target image is smaller than the predetermined value (S13: No), the provision unit 24 counts the number of objects pertaining to people in the tagging target image (S20). The provision unit 24 adds an "urban landscape" tag to the tagging target image when one or more objects pertaining to people are included in the tagging target image, whereas the provision unit 24 adds a "natural landscape" tag to the tagging target image when no objects pertaining to people are included in the tagging target image (S21).

In contrast, when determining that a magnitude of an attention vector in the tagging target image is equal to or greater than the predetermined value (S13: Yes), the provision unit 24 determines whether the direction of the attention vector indicates the front direction or a direction other than the front direction (S14).

When determining that the direction of the attention vector indicates the front direction (S14: Front direction), the provision unit 24 counts the number of areas (valid areas) corresponding to attention vectors having magnitudes equal to or greater than a predetermined value (S15). When the tagging target image includes two or more valid areas (S15: two or more), the provision unit 24 determines whether objects are arranged evenly or unevenly in the tagging target image (S16).

The three steps S17 through S19 are steps in which similar processing is performed. In specific, the provision unit 24 determines whether a valid area in the tagging target image has an occupation proportion equal to or greater than ⅓ in Steps S17 through S19. Note that when the tagging target image includes two or more valid areas, the provision unit 24 performs the above-described determination according to a total occupation proportion, which is obtained by adding the occupation proportions of the two or more valid areas.

In most cases, when a person appears covering a great area in the tagging target image, the occupation proportion of the valid area in the tagging target image equals or exceeds ⅓ (S17: equal to or greater than ⅓, S18: equal to or greater than ⅓, S19: equal to or greater than ⅓). As such, the provision unit 24 provides a portrait-type tag to the tagging target image (S21).

In contrast, when a person appears covering only a small area in the tagging target image while the background appears covering a great area, the occupation proportion of the valid area in the tagging target image falls below ⅓ (S17: smaller than ⅓, S18: smaller than ⅓, S19: smaller than ⅓). As such, the provision unit 24 provides a landmark-type tag to the tagging target image (S21).

When the provision unit 24 determines in Step S14 that the direction of the attention vector in the tagging target image indicates a direction other than the front direction, processing proceeds to the flow illustrated in FIG. 9. In the flowchart illustrated in FIG. 9, Step S23 is similar to Step S15 in FIG. 8, Step S24 is similar to Step S16 in FIG. 8, Steps S25 through S27 are similar to Steps S17 through S19 in FIG. 8, and Step S28 is similar to Step S21 in FIG. 8. As such, description on such steps is omitted in the following.

Subsequently, description is provided on a flow of processing for providing tags to images A through D according to the flow of processing illustrated in FIGS. 8 and 9, with reference to FIGS. 10A and 10B and FIGS. 11C and 11D.

Image A (FIG. 10A)

The provision unit 24 obtains attention vector information (attention vectors 1 and 2) corresponding to image A from the attention vector information storage unit 20 (S12).

An affirmative determination is made in Step S13 (Step S13: Yes) since the magnitude of attention vector 1 is "0.23" (refer to FIG. 7), which is greater than "0.10". Further, concerning the direction components of attention vectors 1 and 2, vectors $V_{O1,O2}$ and $V_{O3,O4}$, which compose attention vector 1 and which are directed towards the front direction, are considerably greater than vectors $V_{O5,O6}$ and $V_{O7,O8}$, which compose attention vector 2 and which are directed towards the left-hand direction, as illustrated in FIG. 6C. Accordingly, the provision unit 24 determines that a direction component of an attention vector pertaining to image A indicates the front direction (S14: Front direction).

In Step S15, where the number of valid areas in the tagging target image is counted, the provision unit 24 determines that one valid area exists in image A (S15: one). This is since, in image A, the magnitude of the attention vector 1 for area 1 indicates "0.23" and the magnitude of the attention vector 2 for area 2 indicates "0.11", and therefore, the number of areas having a magnitude equal to or greater than "0.15" is one in this case. In other words, the provision unit 24 determines that area 1 is a valid area while determining that area 2 is an area that is not valid (an invalid area).

Since area 1 is the only valid area in image A and since the occupation proportion of area 1 in image A is smaller than 1/3, the provision unit 24 judges that the occupation proportion of the valid area in image A is smaller than 1/3 (Step S19: smaller than 1/3).

As such, the provision unit 24 adds a "landmark 3" tag to image A.

Image B (FIG. 10B)

Image B is an image in which two people facing the camera appear side-by-side.

Similar to image A, the attention vector in image B is directed in the front direction, and the number of areas having a size equal to or greater than the predetermined size in image B is one (S14: Front direction, S15: one).

Here, it should be noted that image B differs from image A in that the size of the valid area in image B is equal to or greater than 1/3 (S19: equal to or greater than 1/3).

As such, the provision unit 24 adds a "portrait 3" tag to image B.

Image C (FIG. 11C)

Image C is an image in which people moving on bicycles appear.

Since, among the components of the attention vector in image C, the direction component in particular indicates the lower-left direction, the provision unit 24 determines that the direction of the attention vector in image C indicates a direction other than the front direction (S14: Non-front direction).

Further, the provision unit 24 determines that the number of valid areas in image C is two (S23: equal to or greater than two). In addition, since the two valid areas have similar sizes, the provision unit 24 determines that objects are arranged evenly in image C (S24: arranged evenly).

Further, since the total occupation proportion obtained by summing the occupation proportions of the two valid areas is equal to or greater than 1/3 (S25: equal to or greater than 1/3), the provision unit 24 adds a "surroundings-of-people 1" tag to image C.

Image D (FIG. 11D)

Image D is an image in which a person calling his dog appears.

Since, the direction component and the rotation component of the attention vector in image D commonly indicate the lower-left direction, the provision unit 24 determines that the direction of the attention vector in image D indicates a direction other than the front direction (S14: Non-front direction).

Further, since the number of valid areas in image D is one (S23: one) and the occupation proportion of the valid area in image D is smaller than 1/3 (S27: smaller than 1/3), the provision unit 24 adds a "target-of-attention 3" tag to image D.

The aforementioned tags, such as the "landmark 3" tag, may be associated with alternative names and icons as illustrated in FIG. 12 so as to enable a user to quickly comprehend the meaning of the tags.

As description is provided up to this point, the present embodiment realizes the provision of tags to images according to attention vectors in the images. Such tags are useful in the classification of images and in the search for a desired image among the images. Further, such tags may also function as keys enabling users to recognize contents of images.

Embodiment 2

Embodiment 2 of the present invention relates to a structure for calculating attention degrees of areas in an image and for extracting an area having a particularly high attention degree from the image by taking into consideration attention vectors for objects in the image in a holistic manner.

In specific, according to the present embodiment, an area in an image (referred to hereinafter as an attention area) that can be estimated as attracting attention of an object in the image is determined according to a direction of an attention vector in the image and an area based on which the attention vector has been calculated.

Note that in the present embodiment, structures having the same functions as the corresponding structures in embodiment 1 are provided with the same reference signs, and description on such structures is omitted.

Figure 13:
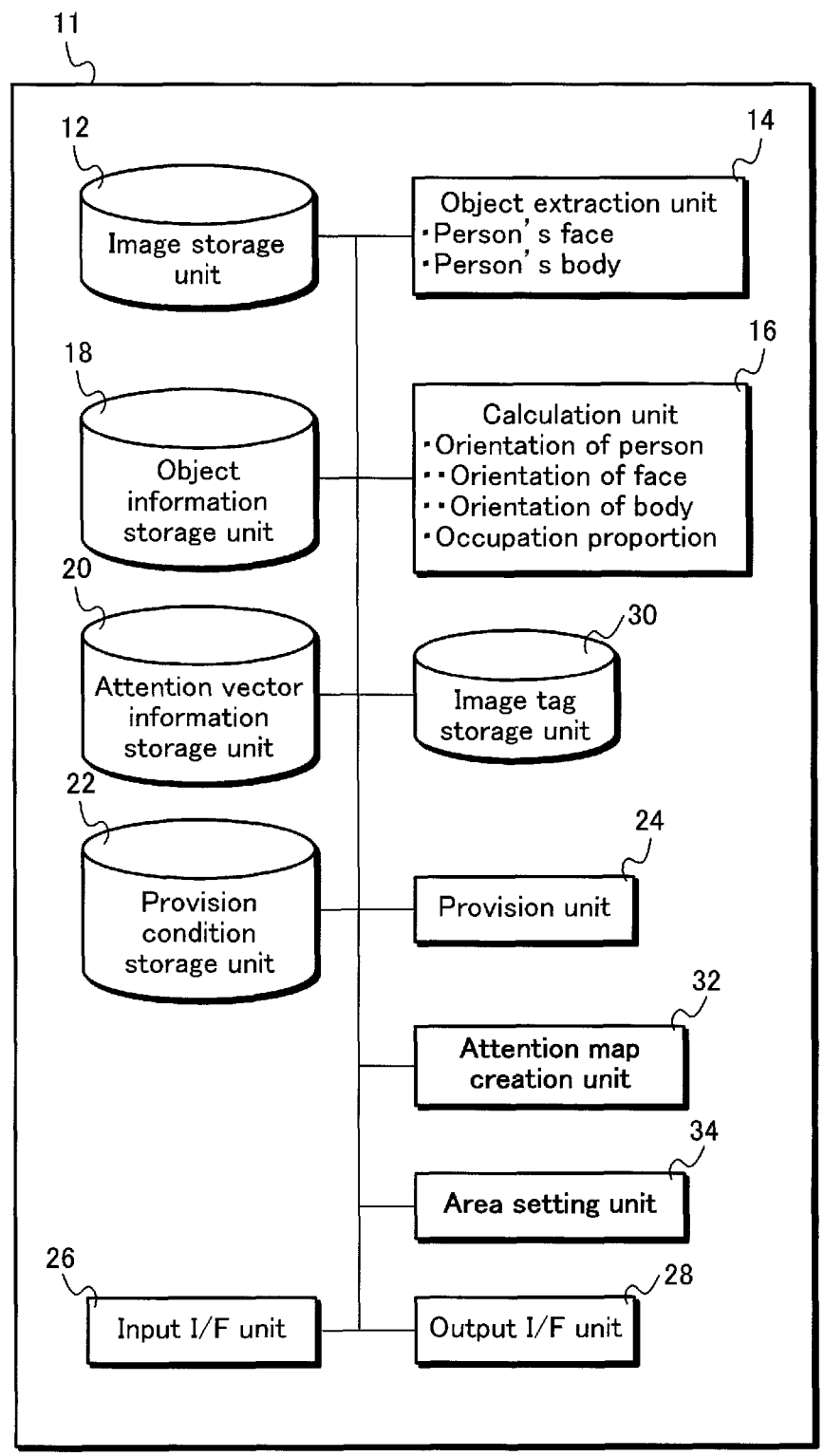
FIG. 13 is a functional block diagram of an image information processing apparatus 11.

FIG. 13 is a functional block diagram illustrating an image information processing apparatus 11 pertaining to embodiment 2.

The image information processing apparatus 11 includes an attention degree map creation unit 32 and an area setting unit 34, in addition to the functional blocks included in the image information processing apparatus 10.

The attention degree map creation unit 32 creates, for each object included in an image, a corresponding attention degree map. An attention degree map for an object is displayed in the image and indicates degrees of attention, i.e., attention degrees, attracted by areas of the image upon shooting of the image. That is, an area in an attention degree map indicating a high attention degree corresponds to an area in an image that is likely to have attracted much attention in a photographed scene appearing in the image. Therefore, it could also be said that an area in an attention degree map indicating a high attention degree corresponds to an area in an image that is likely to have attracted the attention of the photographer of the image.

The attention degree map creation unit 32 creates a total attention degree map by summing all attention degree maps having been created for objects included in an image.

The area setting unit 34 sets a rectangular area exhibiting an attention degree equal to or greater than a predetermined threshold in the total attention degree map as an attention area in the image.

Subsequently, description is provided on how the attention degree map creation unit 32 determines attention degrees of areas in an image. As indicated in the flow of processing illustrated in FIG. 14, the attention degree map creation unit 32 obtains necessary information from the object information storage unit 18 and the attention vector information storage unit 20 (S31).

Subsequently, the attention degree map creation unit 32 sets one object in an image as a target object for creating an attention degree map (S32).

Following this, the attention degree map creation unit 32 creates an attention degree map for the target object according to the object information and the attention vector information (S33).

To describe the processing performed in Step S33 in further detail, the processing in Step S33 is actually performed by the following Procedures 1 through 3 being performed sequentially.

(1) Procedure 1: specification of a direction indicated by a direction component of an attention vector for the target object.

(2) Procedure 2: determination of which of (i) a blank space existing in the specified direction with respect to a center of balance of the target object and (ii) a blank space existing in a direction opposite the specified direction with respect to the center of balance of the target object has a greater area. Here, reference is made to the center of balance of the target object in determining which blank space has a greater area. However, other points in the image may be referred to in the determination provided that the point that is referred to is included within the area of the image occupied by the target object.

(3) Procedure 3: allocation of a high attention degree to an area that is located in a side of the image extending in the direction of the greater blank space from the area occupied by the target object and that is closer to an axis extending along the specified direction described above (i.e., an axis extending along the attention vector).

Such procedures are performed since it can be assumed that the side of the image extending in the direction of the greater blank space has attracted the attention of the photographer upon shooting of the image to a great extent compared to the opposite side of the image extending in the direction of the smaller blank space. For instance, in image A (refer to FIG. 6A), it can be assumed that the tower appearing behind the two people A and B who appear in the foreground in image A attracted the attention of the photographer upon shooting of image A.

In the following, description is provided in further detail by taking as an example a case where an attention degree map based on object O3, which is an object of a person's body in image A, is created in image A.

Figure 15:
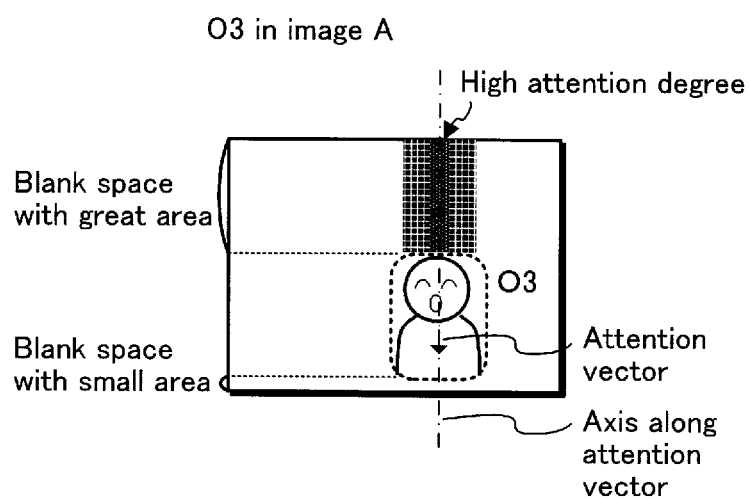
FIG. 15 provides an idea of how an attention degree of object O3 in image A is set.

As illustrated in FIG. 15, an attention vector for object O3 is directed towards the lower direction in image A. Further, when comparing (i) a blank space existing in the lower direction of the attention vector with respect to an area occupied by the target object O3 and (ii) a blank space existing in the upper direction of the attention vector with respect to the area occupied by the target object O3, the blank space existing in the upper direction has a greater area. As such, a high attention degree is allocated to an area located in a side of image A existing in the upper direction of the attention vector with respect to the area occupied by the target object O3.

Figure 14:
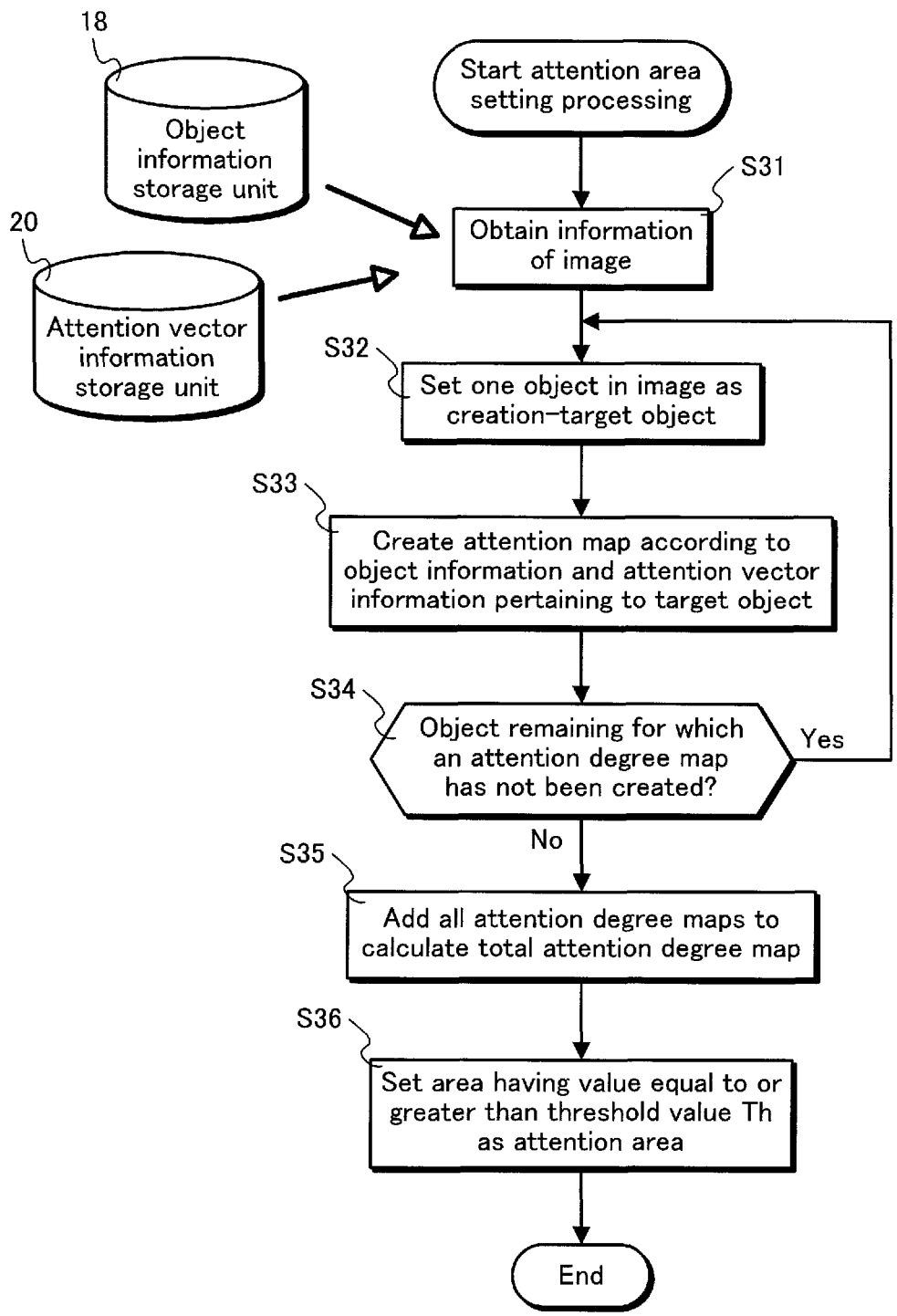
FIG. 14 is a flowchart illustrating a flow of attention area setting processing.

In the following, description continues on the flow of processing illustrated in FIG. 14. The attention degree map creation unit 32 repeats the processing in Steps S32 and S33 until there are no objects remaining for which an attention degree map has not been created (S34). In the case of image A (refer to FIG. 6), since image A includes eight objects O1 through O8, the attention degree map creation unit 32 repeats the processing in Steps S32 and S33 for a total of eight times to create attention degree maps for all of the eight objects.

Figure 16A:
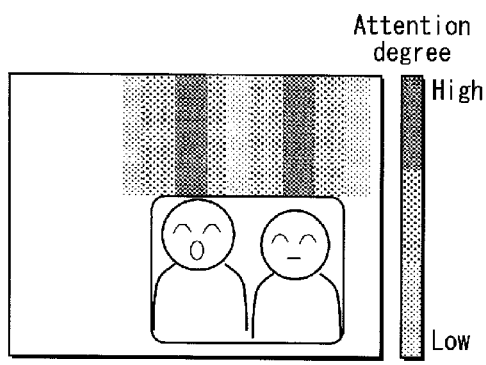
FIG. 16A provides an idea of how attention degrees of person A and person B (objects O1 through O4) in image A are set, and FIG. 16B provides an idea of how attention degrees of person C and person D (objects O5 through O8) in image A is set.
Figure 16B:
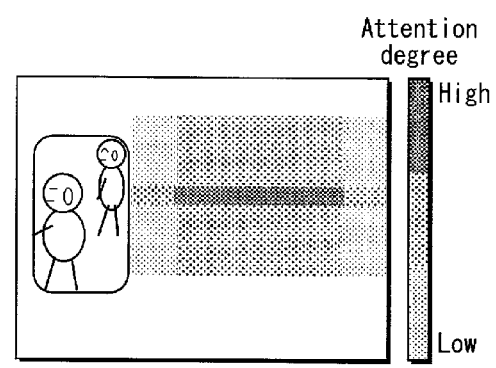

Subsequently, the attention degree map creation unit 32 calculates a total attention degree map by adding all attention degree maps having been created (S35). FIG. 16A illustrates an attention degree map corresponding to people A and B (including objects O1 through O4) in image A. Similarly, FIG. 16B illustrates an attention degree map corresponding to people C and D (including objects O5 through O8) in image A. Here, note that since objects O5 through O8 corresponding to person C and D appear relatively small in image A, the attention degree map illustrated in FIG. 16B indicates a distribution of relatively low attention degrees compared to the distribution of attention degrees in FIG. 16A.

Following the calculation of a total attention degree map, the area setting unit 34 sets, as an attention area, an area in the total attention degree map having a value equal to or greater than a threshold value Th (i.e., extracts such an area as an attention area) (S36).

In the following, description is provided on the setting of an attention area by referring to the example of image A. The attention map creation unit 32 creates the total attention degree map illustrated in FIG. 17A by adding the attention degree map illustrated in FIG. 16A and the attention degree map illustrated in FIG. 16B. Area A in the total attention degree map illustrated in FIG. 17A is an area in which attention degrees exist. As illustrated in FIG. 17B, within area A, the area setting unit 34 sets a rectangular area B, which includes areas whose attention degrees are equal to or greater than the threshold value Th, as the attention area in image A.

Figure 18A:
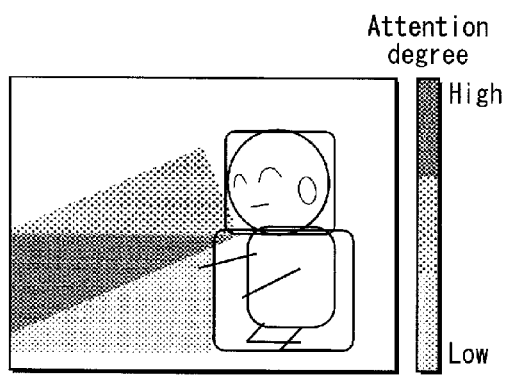
FIG. 18A illustrates a total attention degree map for image D.
Figure 18B:
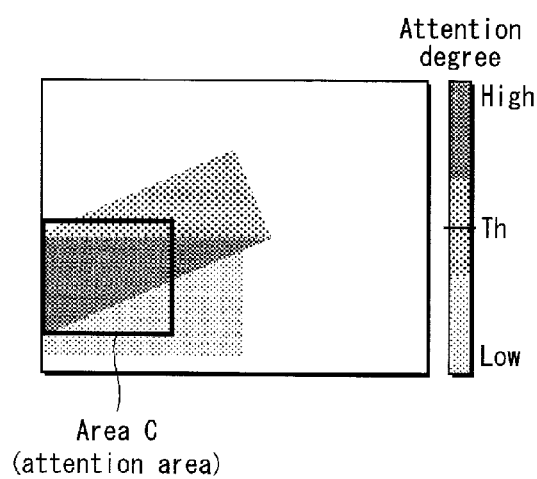
FIG. 18B illustrates an attention area in image D.
Figure 19:
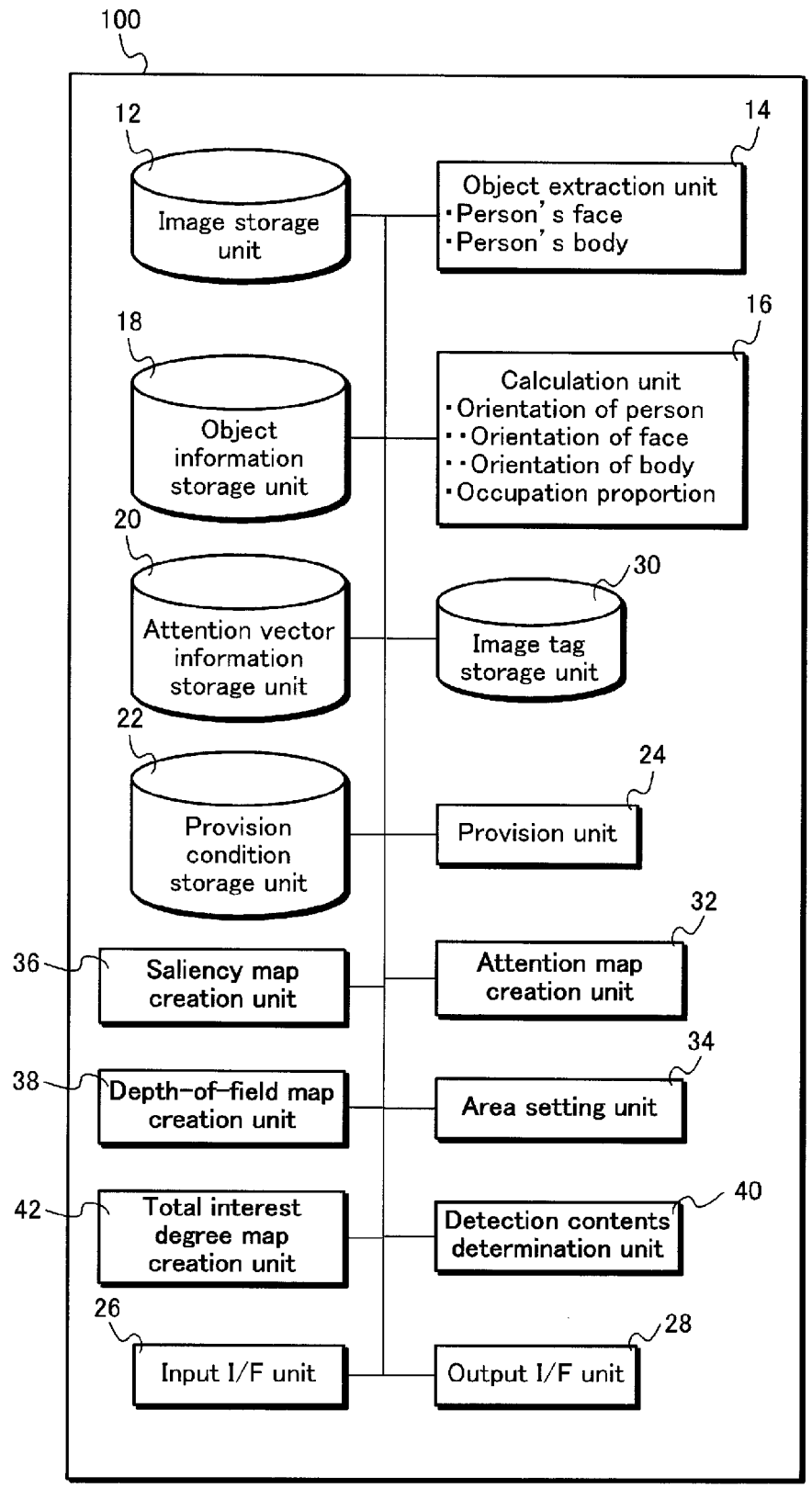
FIG. 19 is a functional block diagram of an image information processing apparatus 100.

FIG. 18A illustrates a total attention degree map for image D (refer to FIG. 11D) and FIG. 18B illustrates the total attention map for image D and an area C in the total attention map for image D, which is set as the attention area.

As description is provided up to this point, the present embodiment enables setting, in an image, an attention area, which is an area likely to have attracted attention upon shooting of the image.

In the description provided above, only a brief explanation has been provided on a general idea applied in map creation by the attention map creation unit 32. However, more precisely, the actual creation of attention degree maps by the attention map creation unit 32 can be performed by using the formulae presented in the following.

Basically, the attention map creation unit 32 calculates an attention degree of a given area in an image in an attention degree map for a given object according to (i) the magnitude of the object, (ii) the direction of the object, and (iii) a distance of the given area from the object along the direction of the object. Note that when attention exists, and further, when the direction indicates the front direction, it is difficult to estimate a direction of attention in the image, particularly when using an object of a person's face in the image. Therefore, in such a case, the attention map creation unit 32 mainly uses a direction indicated by an object of a person's body in the image in the calculation of attention degrees.

In the following Math. 2, N denotes the number of objects, k denotes an object number, $hh_k$ denotes a magnitude of an object of a person's body, $hd_k$ denotes a distance in a direction perpendicular to a direction of a person's body, and $hw_k$ denotes a constant for normalization of image size and for weighting of area size.

[Math. 2]

$$Fh(i) = \sum_{k=1}^{N} (hw_k \times hh_k \times (1/hd_k))$$

(Math. 2)

An attention degree map Fh(i) of an ith attention vector is calculated by using Math. 2.

Here, it should be noted that Math. 2 is effective only in a direction extending from an area occupied by an object in an image towards the greatest area that is not occupied by an object in the entire area of an image.

In addition, in the calculation of $hd_k$, synthesis is performed of an orientation and a rotation of a person's body, and further, conversion is performed into a direction within a two-dimensional image.

Further, when attention exists, and further, when the direction indicates a direction other than the front direction, a direction of attention in the image can be estimated from an object of a person's face. Therefore, in such a case, the attention map creation unit 32 mainly uses the direction indicated by an object of a person's face in the calculation of attention degrees.

In the following Math. 3, Q denotes the number of objects of person's faces, p denotes an object number, $fh_p$ denotes a magnitude of an object of a person's face, $fd_p$ denotes a distance in a direction perpendicular to a direction of a person's face, and $fw_p$ denotes a constant for normalization of image size and for weighting of area size.

[Math. 3]

$$Ff(j) = \sum_{p=1}^{Q} (fw_p \times fh_p \times (1/fd_p)) \quad \text{(Math. 3)}$$

An attention degree map Ff(j) of an jth attention vector is calculated by using Math. 3.

In the following Math. 4, cw1 denotes a weight provided to an object of a person's face and cw2 denotes a weight provided to an object of a person's body in a case where the object of the person's face and the object of a person's body belong to the same person X appearing in an image. [Math. 4]

$$Fa(x) = cw1 \times Ff(j) + cw2 \times Fh(i) \quad \text{(Math. 4)}$$

An attention degree map Fa(x) for person X, which is a combination of an object of a person's face and an object of a person's body belonging to the same person appearing in an image, is calculated by using Math. 4.

Up to this point, description has been provided solely on a case where detection information for a person, particularly detection information of a face and a body of a person, is used as an object. However, information of other objects detectable in images, for instance pets such as dogs and cats and other common objects that can be detected with high accuracy in images when conventional object recognition is performed, may be used as the object information. In addition, in the calculation of attention maps, a weight provided to an object may be altered for each one of different types of objects, and further, a type of object to be used and a weight provided to an object of a given type may be altered for each one of different types of image composition.

Further in addition, modification may be made such that, when (i) attention exists, (ii) the direction indicates the front direction, and further, (iii) a valid area in the image is occupied by an object, or that is, when a central occupation area in the image is equal to or greater than ⅓ of the entire area of the image, the calculation of attention degrees is not performed judging that a particular attention area does not exist in the image.

An attention area in an image, set in the above-described manner, can be utilized for various purposes. The following examples 1 through 3 provide examples of possible usages of an attention area in an image.

(1) Example 1

By visualization, in an image, of an attention area (and an attention degree map), a user can use the attention area as supplementary information in making a selection of an area in the image.

(2) Example 2

By cutting out only an attention area from an image, the attention area can be used for editing such as the creation of a thumbnail image.

(3) Example 3

By setting an attention area as an extraction target for extraction of characteristic values (e.g., edge information, texture, luminous intensity, and color information) and providing the image with a tag according to the characteristic values extracted from the attention area, the image can be provided with a tag having an increased degree of appropriateness. For instance, when a great amount of green color components are extracted from within an attention area in an image, the image may be provided with a "color: green" tag or may be provided with a natural landscape-type tag that has affinity with the color green. To provide another example, when an architectural structure "tower" is extracted from an area B, which is the attention area in image A, a "tower" tag can be provided to image A.

Embodiment 3

Embodiment 3 enables provision of a tag having an increased degree of appropriateness to an image by taking into consideration not only a degree of attention directed towards objects upon shooting of the image but also information (for instance, a saliency map) concerning viewing of the photographed image.

An image information processing apparatus 100 pertaining to embodiment 3 includes a saliency map creation unit 36, a depth-of-field map creation unit 38, a detection contents determination unit 40, and a total interest degree map creation unit 42. Since the rest of the functional blocks included in the image information processing apparatus 100 are similar to those illustrated in FIG. 13, description thereon is omitted in the following.

The saliency map creation unit 36 creates a saliency map for an image. A saliency map for an image indicates intensity of human visual attention of portions of the image. In other words, a saliency map for an image indicates portions of the image that attract people's attention and portions of the image that do not attract people's attention.

A saliency map for an image is created by performing predetermined calculations based on the intensity, the colors, and the orientations of the input image. A conventional method, such as the method disclosed in detail in Non-Patent Literature 2 [Laurent Itti, Christof Koch, Ernst Niebur, "A Model of Saliency-based Visual Attention for Rapid Scene Analysis", IEEE, Vol. 20, No. 11, pp. 1254-1259, 1998], can be utilized for the creation of a saliency map. As such, description concerning the method for creating a saliency map is omitted herein.

The depth-of-field map creation unit 38 creates a depth-of-field map for an image, which indicates different depth of fields in the image. More specifically, a depth-of-field map indicates portions of an image having a relatively deep depth of field and portions of the image having a relatively shallow depth of field.

The detection contents determination unit 40 determines contents of an image which are to be detected. The determination is performed according to values indicated in the item "type" in the object information storage unit 18 or the attention vector information storage unit 20 (refer to FIG. 7) or values in a total attention degree map created by the attention map creation unit 32.

The following provides examples of the determination performed by the detection contents determination unit 40. When a target image is a portrait-type image, the detection contents determination unit 40 does not perform detection of contents since a tag is provided to the target image focusing on people appearing therein. When a target image is a landmark-type image, the detection contents determination unit 40 performs a search focusing on architectural structures in the image particularly when an attention area of the image exists closer to the foreground of the image than people appearing in the image and when non-human objects exist in the background of the image. When a target image is a surroundings-of-people-type image, the detection contents determination unit 40 performs a search focusing on non-human objects that a person appearing in the image is wearing or holding. When a target image is a target-of-attention-type image, the detection contents determination unit 40 determines whether or not a non-human object exists within an attention area of the image.

In embodiment 3, a total interest degree map for an image is created by combining a total attention degree map for the image, description of which is provided in embodiment 2, and a saliency map (or a depth-of-field map) for the image. Further, an area in an image (a total interest area) is specified based on the total interest degree map.

In the following, description is provided on the flow of such processing, with reference to FIG. 20.

First, the detection contents determination unit 40 determines contents to be detected from an image according to a total attention degree map for the image (S41).

Subsequently, the saliency map creation unit 36 creates a saliency map for the image (S42).

Following the creation of the saliency map by the saliency map creation unit 36, the total interest degree map creation unit 42 creates a total interest degree map by combining the total attention degree map created by the attention map creation unit 32 and the saliency map (S43).

Subsequently, the area setting unit 34 specifies (extracts) an area in the total interest degree map having a value equal to or greater than a predetermined threshold value as a total interest area (S44).

In the following, explanation is provided of the above-described sequence of processing taking image A as an example.

Figure 21:
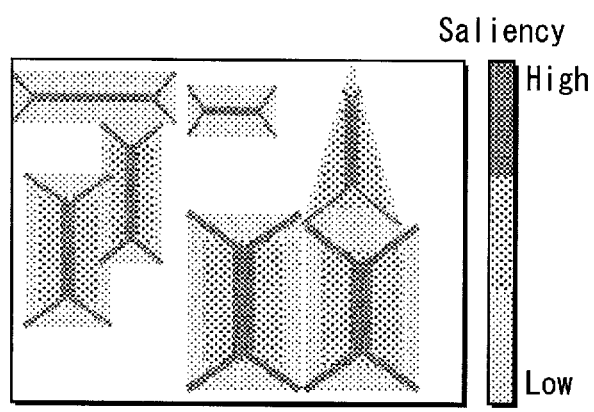
FIG. 21 illustrates a saliency map for image A.

FIG. 21 illustrates a saliency map for image A created by the saliency map creation unit 36. The saliency map indicates high saliency at areas such as (i) rectangular areas where the four people A through D exist, (ii) areas corresponding to the two clouds existing behind people C and D, and (iii) an area corresponding to the tower existing behind people A and B.

Figure 22A:
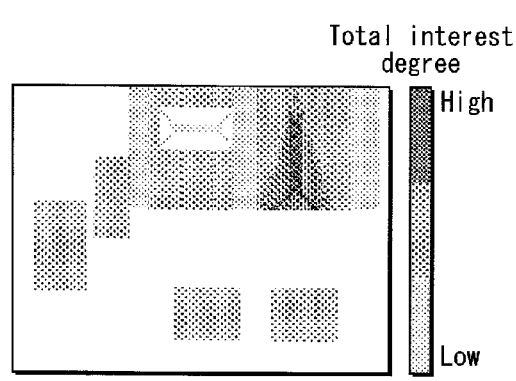
FIG. 22A illustrates a total interest degree map for image A.

FIGS. 22A and B illustrate a total interest degree map created by the total interest degree map creation unit 42 by combining the saliency map illustrated in FIG. 21 and the total attention degree map illustrated in FIG. 17A.

In the saliency map illustrated in FIG. 21, the area corresponding to the tower behind people A and B indicates high saliency. Further, in the total attention degree map illustrated in FIG. 17A, the area corresponding to the tower behind people A and B also indicates a high attention degree. Accordingly, the area corresponding to the tower behind people A and B indicates a particularly high total interest degree in the total interest degree map illustrated in FIGS. 22A and 22B.

Figure 22B:
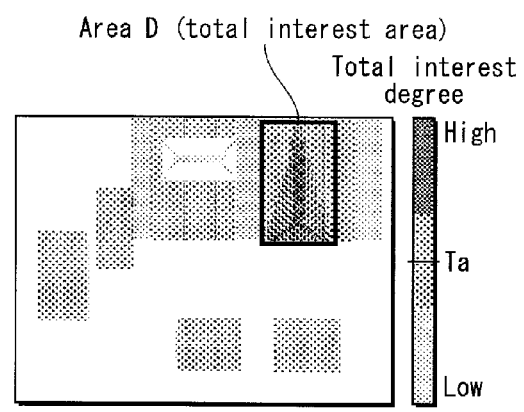
FIG. 22B illustrates a total interest area in image A.

As such, the area setting unit 34 sets a rectangular area D illustrated in FIG. 22B, which includes an area having a total interest degree equal to or greater than a predetermined threshold value Ta, as the total interest area.

As description has been provided up to this point, embodiment 3 enables specification of an area in an image with an increased degree of appropriateness by making use of a saliency map for the image, which indicates a portion of the image that is likely to attract people's attention.

For instance, in FIG. 22B, area D (the total interest area) is precisely set as an area surrounding the tower. As such, by extracting various characteristic values from area D, the tower can be detected from image A and further, image A can be provided with a tag related to the tower.

Figure 20:
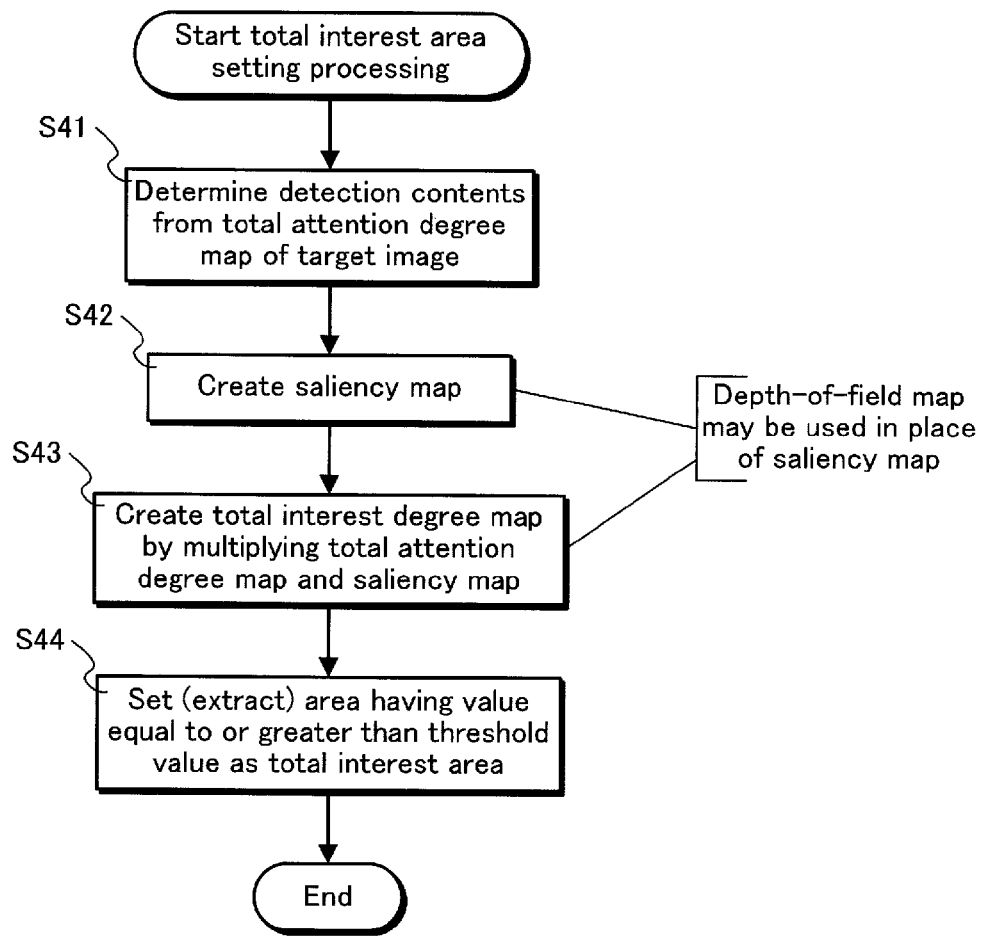
FIG. 20 is a flowchart illustrating a flow of total interest area setting processing.

Here, note that in Steps S42 and S43 in FIG. 20, the depth-of-field map may be used instead of the saliency map. In such a case, it is expected that the specification of an area in an image can be performed with a higher degree of appropriateness since in many cases, the depth of field in an image reflects user's intention upon shooting of the image (for instance, the setting of focal length and the like).

Alternatively, a total interest degree map for an image may be calculated by combining three types of maps for the image, namely the total attention degree map, the saliency map, and the depth-of-field map.

In addition, the image types determined by the detection contents determination unit 40 may be used for altering types of visual characteristics information and photographer intention information to be utilized according to image types and for providing a different weight to different image types.

Further, note that the saliency map is not limited to the type of saliency map described above provided that the saliency map is based on a method of forming a mathematical model representing the characteristics of human visual attention.

Embodiment 4

Embodiment 4 classifies objects in an image including multiple objects into objects of high importance (areas including such objects) and objects of low importance (areas including such objects) and provides a tag to the image while considering the objects of low importance as noise and thereby excluding such objects from consideration.

Accordingly, the provision of a tag to an image is performed according to a narrowed-down number of objects. As a result, processing load can be reduced and the provision of an appropriate tag to an image can be realized.

Figure 23:
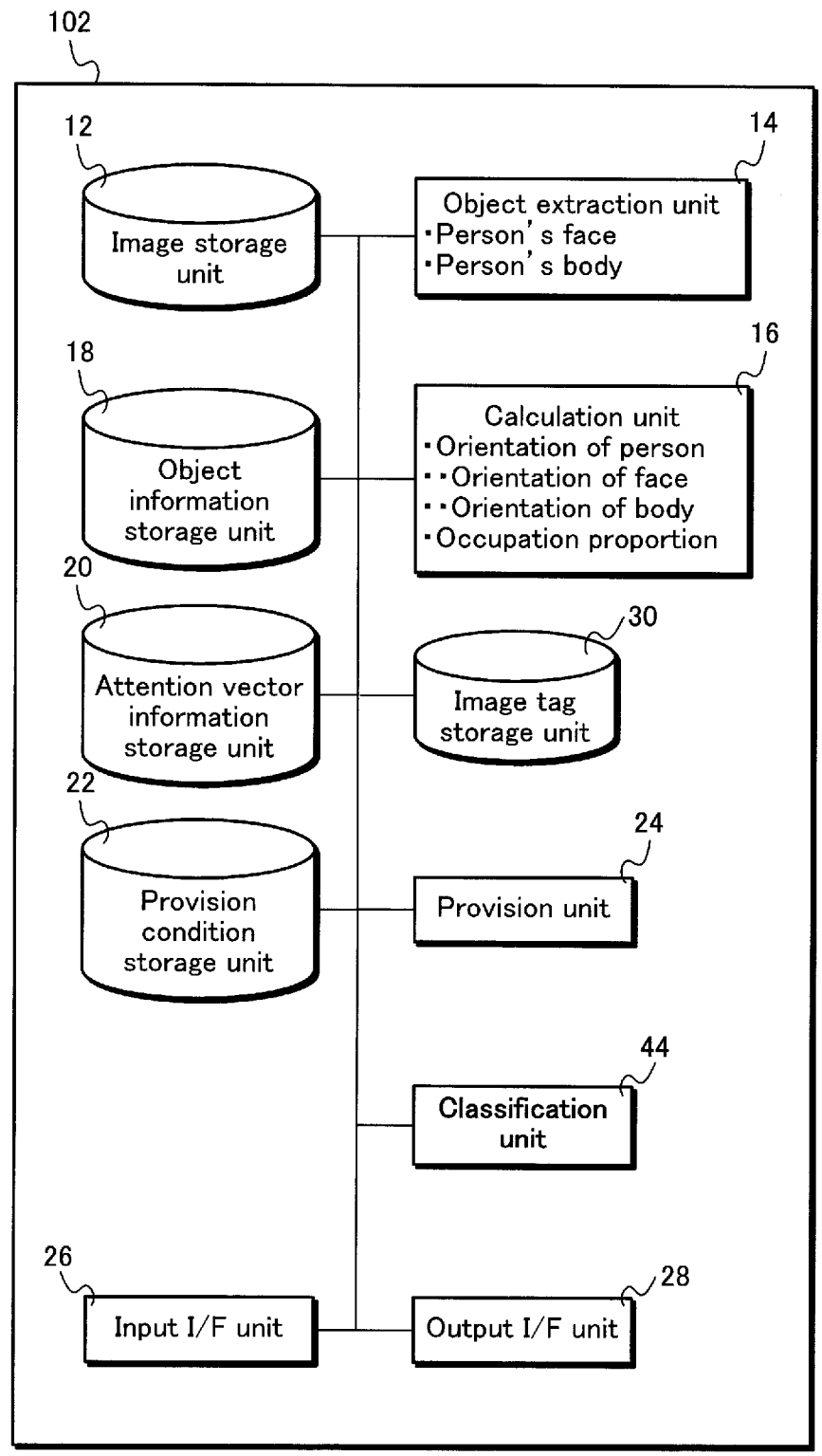
FIG. 23 is a functional block diagram of an image information processing apparatus 102.

FIG. 23 is a functional block diagram of an image information processing apparatus 102. The functional blocks similar as those illustrated in FIG. 1 are provided with the same reference signs, and description thereon is omitted in the following.

The image information processing apparatus 102 includes a classification unit 44.

The classification unit 44 classifies multiple objects included in an image into objects of high importance and objects of low importance as described above.

The two methods provided in the following are applicable as the method for classifying objects in an image.

(1) Method 1: Selecting only some of multiple people appearing in an image and classifying the selected people as objects of importance.

(2) Method 2: Grouping some of multiple people appearing in an image into a group and classifying the people belonging to the group as objects of importance.

One of the two methods described above may be utilized when classifying multiple objects included in an image.

First, explanation is provided of Method 1.

Figure 24A:
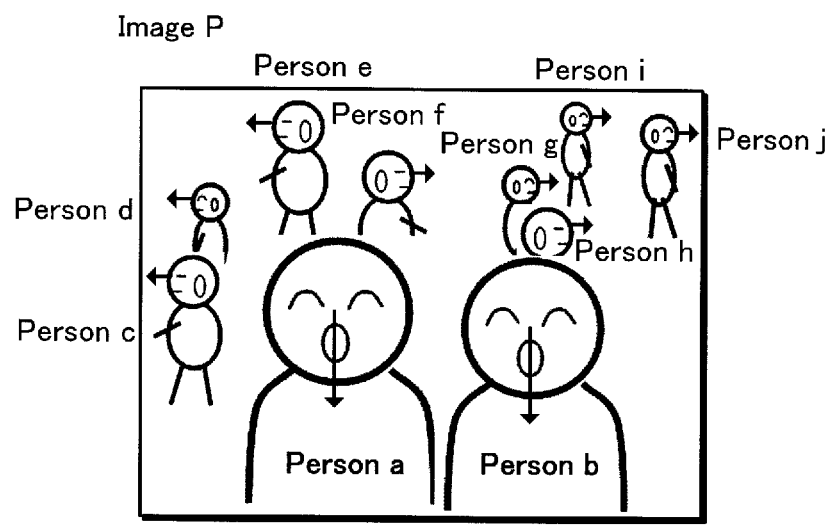
FIG. 24A illustrates image P.

As illustrated in FIG. 24A, image P is an image in which ten people, namely person a through person j, appear. Note that the solid arrows in FIG. 24A indicate attention vectors for the people appearing in image P.

Since image P has been shot in the city with a lot of people around, image P includes not only person a and person b but also person c through person j.

The classification unit 44 selects only people having high reliability degrees among people a through j.

Here, a reliability degree of a person in an image is determined according to (i) a matching accuracy of the person when extraction of people is performed or (ii) an occupation proportion of an area of the person in the image.

Figure 24B:
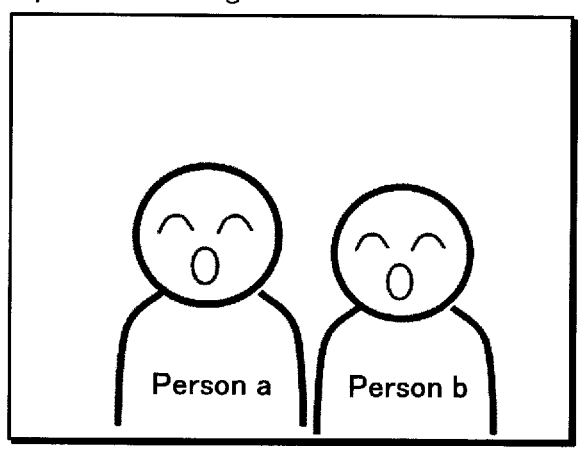
FIG. 24B illustrates objects in image P that are used in provision of a tag to image P.

As a result, two people in image P, namely person a and person b, are set as objects based on which the provision of a tag to image P is performed as illustrated in FIG. 24B.

Subsequently, explanation is provided of Method 2.

Method 2 involves grouping some of multiple people appearing in an image into a group and classifying the people belonging to the group as objects of high importance.

Figure 25:
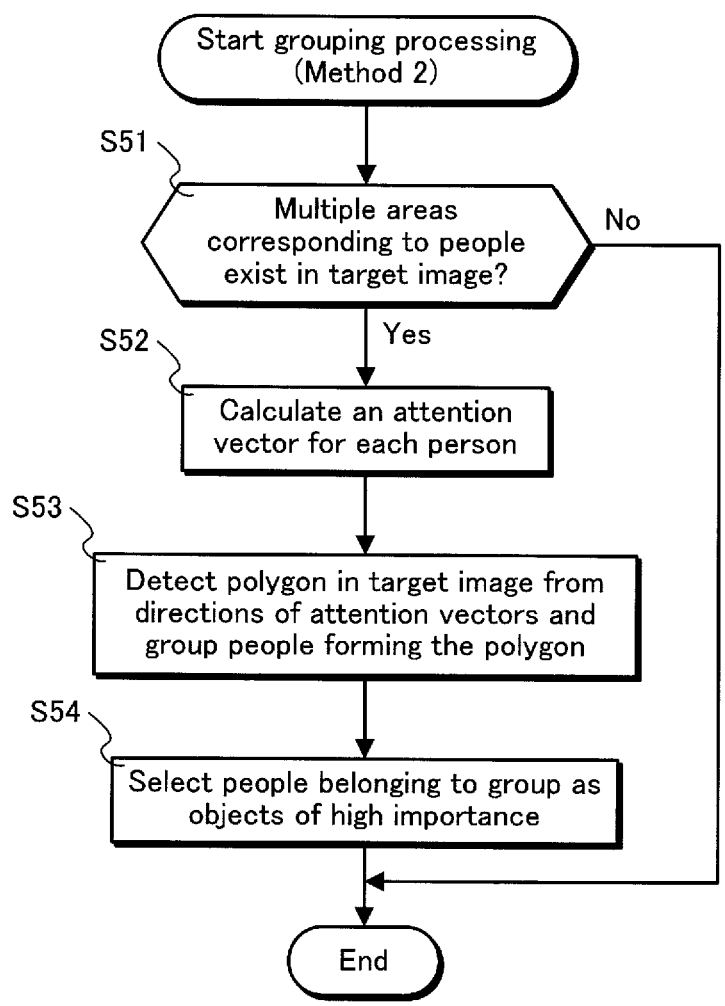
FIG. 25 is a flowchart illustrating a flow of grouping processing (Method 2).

In the processing involved in Method 2, which is illustrated in FIG. 25, the classification unit 44 determines whether an image includes multiple areas corresponding to people (S51).

When the image includes multiple areas corresponding to people (S51: Yes), the classification unit 44 calculates an attention vector for each of the people (S52).

Subsequently, the classification 44 detects a polygon in the image according to the directions of the multiple attention vectors calculated, and groups only the people (the areas of the image including the people) constituting the polygon (S53).

Finally, the classification unit 44 classifies the people belonging to the group as objects of high importance (S54).

In the following, description is provided on an example of the processing in Step S53, with reference to FIGS. 26A and 26B.

Figure 26A:
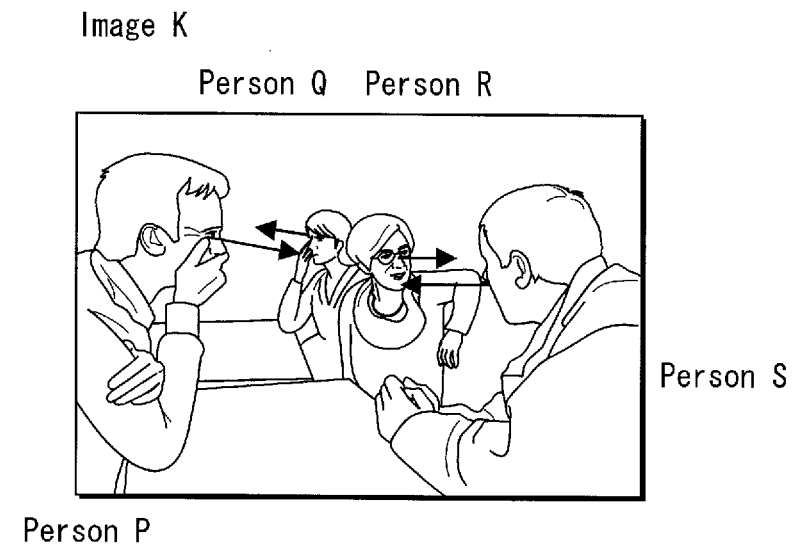
FIG. 26A illustrates image K.

Image K illustrated in FIG. 26A is an image in which four people, namely person P, person Q, person R, and person S from left to right in the image, appear.

Figure 26B:
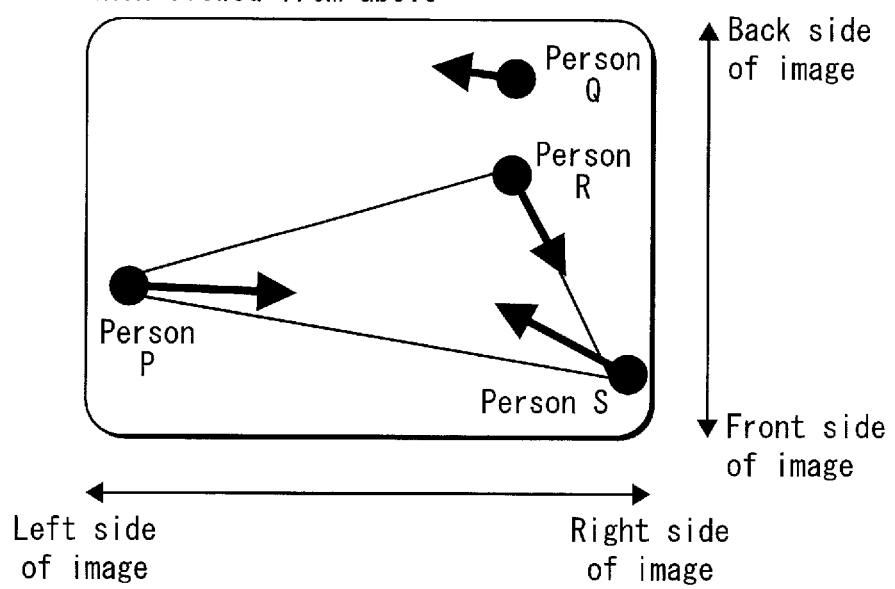
FIG. 26B illustrates attention vectors in image K when image K is view from above.

FIG. 26B illustrates the four attention vectors in image K when assuming that image K were viewed from above. The classification unit 44 detects a triangle formed by attention vectors of people P, R, S in image K according to the direction and the magnitude of each of the attention vectors for the people P, Q, R, S. Following the detection of the triangle formed in image K, the classification unit 44 groups the three people P, R, S. Subsequently, the classification unit 44 classifies people P, R, S in image K as objects of high importance and, on the other hand, classifies person Q as an object of low importance.

As one modification of Method 2, the grouping of objects can be performed according to similarity between attention vectors for objects.

Figure 27:
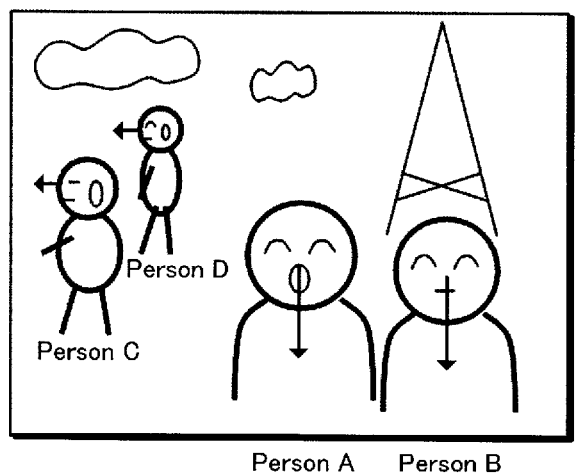
FIG. 27 illustrates image A.

For instance, as illustrated in FIG. 27, person A and person B in image A commonly have an attention vector whose direction indicates the front direction, and therefore, may be grouped into one group. Similarly, person C and person D commonly having an attention vector whose direction indicates the left-direction may be grouped into another group.

Embodiment 5

Embodiment 5 enables extraction of multiple linear segments from an image and setting of a convergence area in the image in a direction in which the multiple linear segments converge. The convergence area that is set in the above-described manner can be used for various purposes similar as the attention area description of which is provided in embodiment 2.

Figure 28:
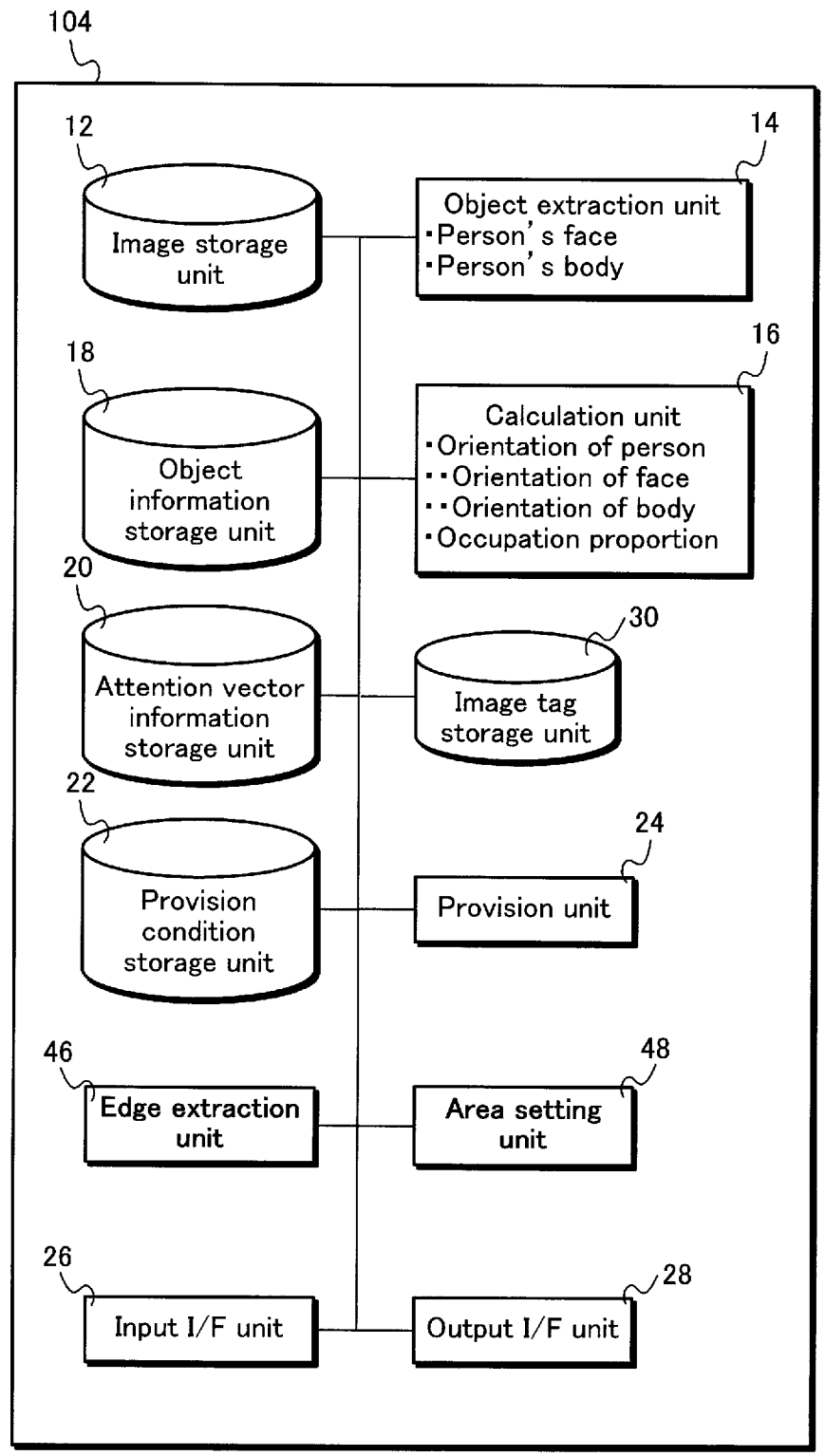
FIG. 28 is a functional block diagram of an image information processing apparatus 104.

FIG. 28 is a functional block diagram of an image information processing apparatus 104. The functional blocks similar as those illustrated in FIG. 1 are provided with the same reference signs, and description thereon is omitted in the following.

An edge extraction unit 46 of the image information processing apparatus 104 extracts, as an edge, a portion of an image where a rapid change in shading is observed. An edge extracted by the edge extraction unit 46 may exhibit any two-dimensional shape such as a circle, a curve, and a linear segment.

An area setting unit 48 of the image information processing apparatus 104 sets a convergence area in a side of the image at which multiple linear segments extracted from the image converge.

Figure 29:
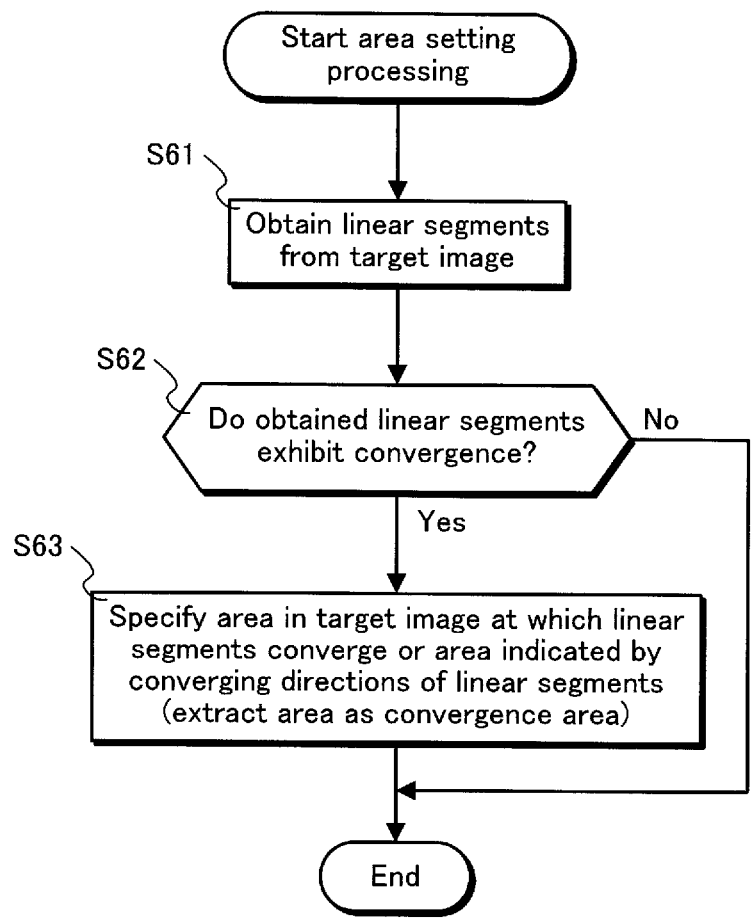
FIG. 29 is a flowchart illustrating a flow of area setting processing.

FIG. 29 is a flowchart illustrating a flow of area setting processing performed by the area setting unit 48.

First, the area setting unit 48 obtains linear segments included in the image from the edge extraction unit 46 (S61).

Subsequently, the area setting unit 48 determines whether or not the linear segments obtained from the edge extraction unit 46 exhibit convergence (S62). Here, when the linear segments exhibit convergence, lines which are obtained by extending the linear segments meet (converge) at a given location in the image. As such, it can be said that the area setting unit 48 determines whether or not such lines meet at a given location in the image.

When determining that the linear segments exhibit convergence (S62: Yes), the area setting unit 48 specifies an area in the image at which the linear segments converge or an area indicated by the converging directions of the linear segments (extracts such an area as a convergence area) (S63).

Figure 30A:
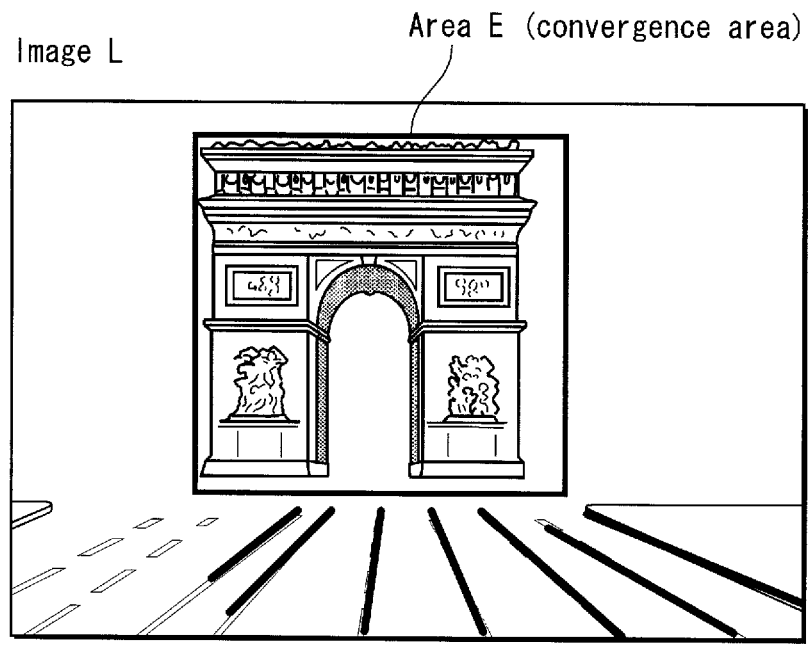
FIG. 30A illustrates image L.

For instance, FIG. 30A illustrates an image L in which a triumphal arch appears. When the linear segments extracted from the markings painted on the road and the bus illustrated in FIG. 30A are extended, the lines as illustrated in FIG. 30B can be obtained.

Figure 30B:
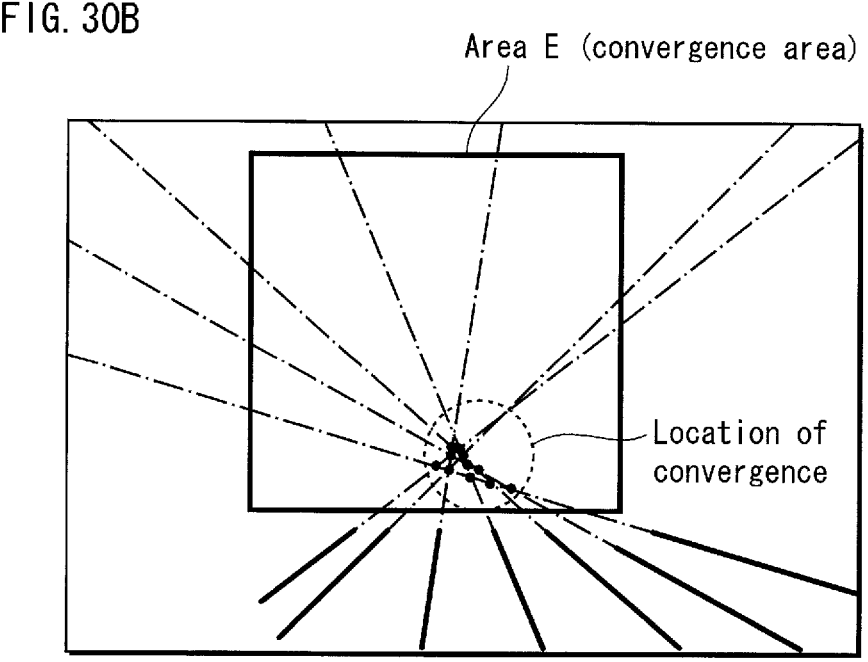
FIG. 30B illustrates a location of convergence in image L.
Figure 31:
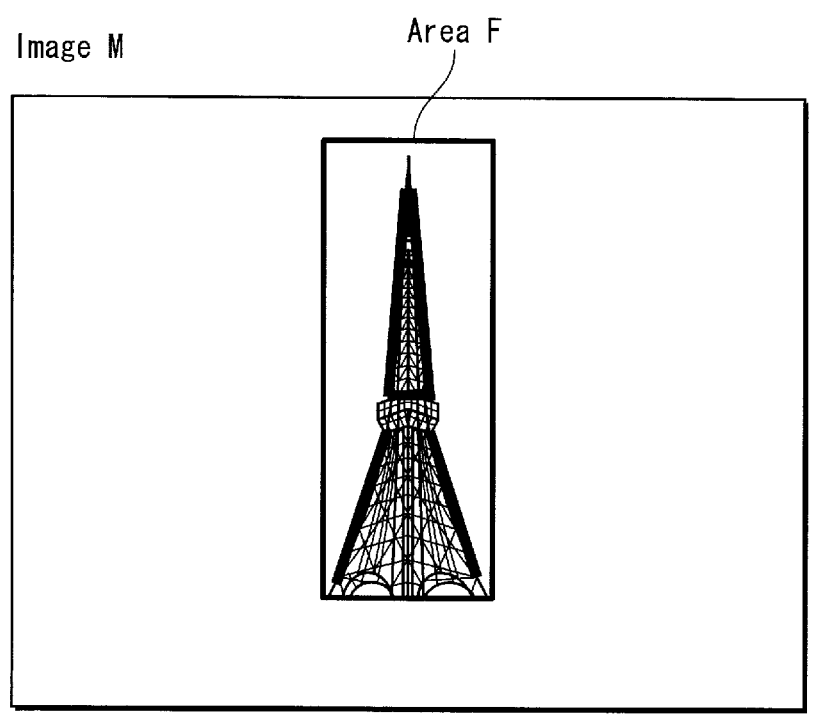
FIG. 31 illustrates image M.

Further, it is determined that the multiple lines illustrated in FIG. 30B converge at a specific location in image L (the lines meet at a specific location, and many of the lines cross each other at the specific location).

The area setting unit specifies an area E surrounding and including the specific location.

Note that in Step S62, the determination may be made by using only main linear segments among the linear segments extracted.

The following modifications (1) through (4) may be made based on embodiment 5.

(1) The two-dimensional shape used for setting the convergence area is not limited to linear segments.

For instance, when a specific object appears covering a great area of an image, an edge characteristic value of an elliptic shape can be extracted from the image. In such a case, the area setting unit 48 may set an area in the image corresponding to a closed region surrounded by the ellipse as the convergence area.

(2) The convergence area may be utilized in combination with the attention area description of which is provided in embodiment 2.

In addition, multiple elements composing a single image may be classified into different types according to different directions of convergence.

(3) In the above, description is provided that two-dimensional shapes in an image are extracted by the edge extraction unit 46. However, the method utilized for extracting two dimensional shapes from an image is not limited to the method utilizing edges, and other conventional methods may also be applied.

(4) The setting of an convergence area is not limited to that utilizing edge components. That is, the setting of an convergence area may be performed by using information such as texture, luminous intensity, and color information pertaining to a target image provided that the information utilized is a characteristic value of the image.

Embodiment 6

Embodiment 6 enables the setting of an index to each tagged image. An index provided to a given image provides more detailed information of the image. The setting of such indexes to images is useful in analysis, evaluation, and searching of images.

Figure 32:
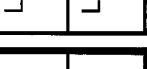
FIG. 32 illustrates indexes.

Description is provided in the following, with reference to FIG. 32.

(1) For an image provided with a people-oriented tag (i.e., a portrait-type tag or a surroundings-of-people-type tag), the object extraction unit 14 executes human recognition processing with respect to the image (for instance, processing of first extracting areas corresponding to faces appearing in the image and then performing face recognition with respect to the extracted areas) so as to specify people appearing in the image.

Subsequently, the calculation unit 16 calculates a type (a person index type) of each of the specified people and a frequency of appearance of each person type. Further, the provision unit 24 sets the results of the calculation as an index to the image.

(2) For an image provided with a tag indicating emphasis in a background appearing in the image (i.e., a landmark-type tag or a target-of-attention-type tag), the calculation unit 16 calculates an attention area in the image and levels pertaining to the attention area (including the size of the attention area, the distribution of attention degrees in the attention area, etc.).

In addition, the object extraction unit 14 executes recognition of non-human objects with respect to the attention area in the image, and the provision unit 24 sets, as an index of the image, information indicating existence/non-existence and types of non-human objects in the image.

(3) For an image provided with a tag indicating non-existence of a person in the image (i.e., an urban landscape tag or a natural landscape tag), the provision unit 24 sets, as an index of the image, information indicating landscape types, a frequency of appearance of each landscape type, and the results of recognition of non-human objects.

Embodiment 7

Figure 33:
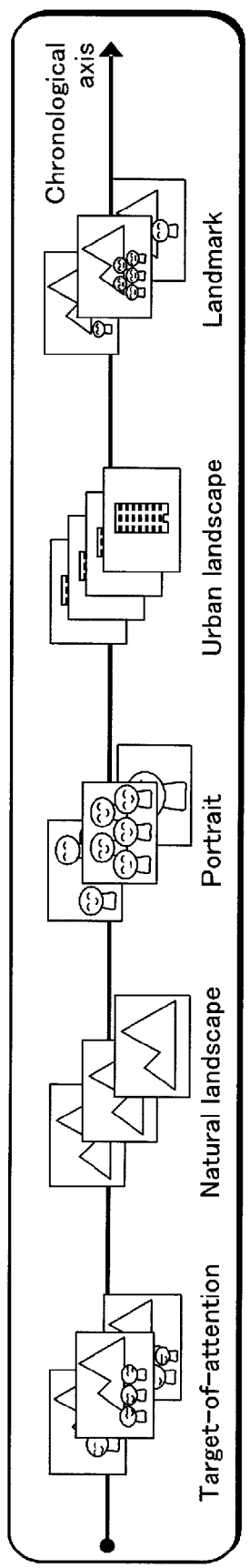
FIG. 33 illustrates groups of images on a chronological axis.

Embodiment 7 assists generation of albums and slideshows from groups of tagged images (refer to FIG. 33).

Figure 34:
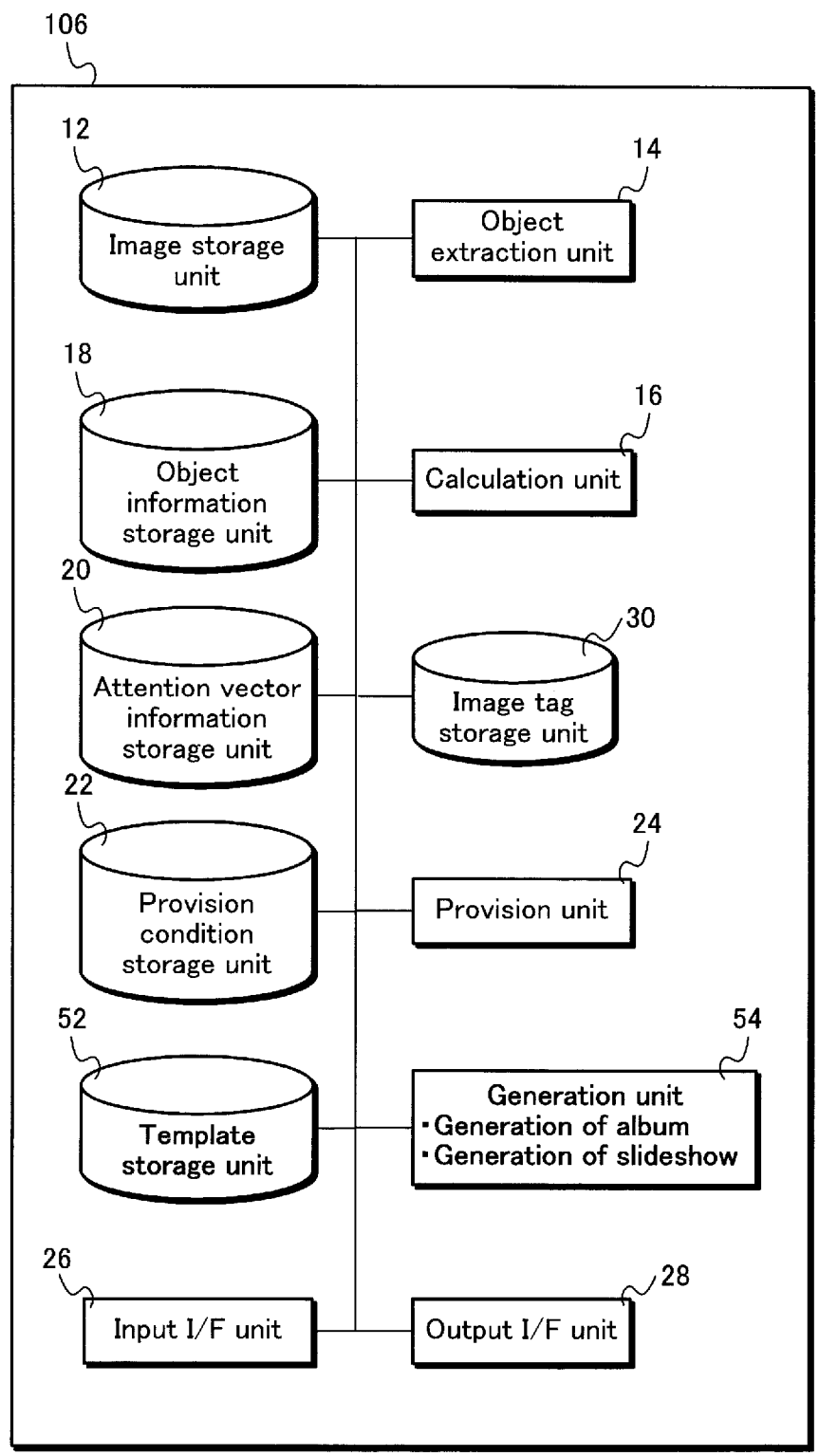
FIG. 34 is a functional block diagram of an image information processing apparatus 106.

As illustrated in FIG. 34, an image information processing apparatus 106 includes a template storage unit 52 and a generation unit 54. Since the rest of the functional blocks included in the image information processing apparatus 106 are similar to those included in the image information processing apparatus 10 illustrated in FIG. 1, description thereon is omitted in the following.

The generation unit 54 generates albums and slideshows by using templates related to albums and slideshows stored in the template storage unit 52.

(1) Generation of Album

Figure 35A:
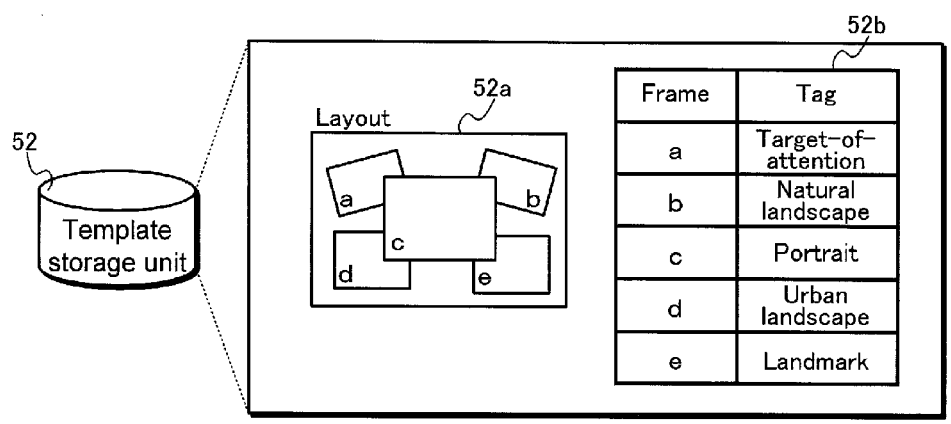
FIG. 35A illustrates contents stored in a template storage unit 52.

As illustrated in FIG. 35A, the template storage unit 52 stores an album layout 52a and a table 52b.

The album layout 52a indicates an arrangement of five frames, namely frame a through frame e. The table 52b indicates the correspondence between the frames in the layout 52a and tags.

Figure 35B:
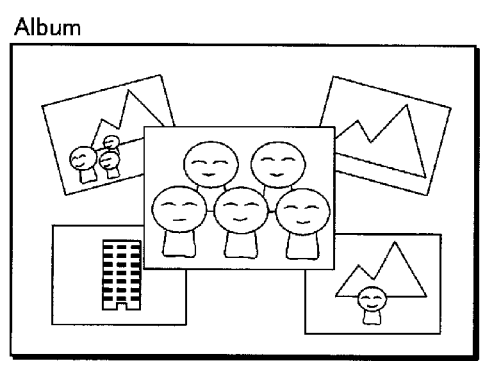
FIG. 35B illustrates an example of an album.

The generation unit 54 generates an album by inserting, into each of the frames, an image to which a tag corresponding to the frame is provided according to the album layout 52a and the table 52b. FIG. 35B illustrates an example of an album that is generated.

Note that, when there are multiple images provided with the same tag as illustrated in FIG. 33, one of the images is to be selected. The selection of one image among the multiple images provided with the same tag may be performed according to input received from a user. Alternatively, the selection may be performed automatically such that a score is calculated for each of the images according to an index (refer to embodiment 6) set to each image, and an image having the highest score is selected, for instance.

As such, the present embodiment assists the generation of an album. In particular, since the generation of an album is performed by using tags provided to images, an album in which people, landscapes, and landmarks are arranged in a good balance can be created.

Note that modification may be made such that templates for multiple types of albums are stored in the template storage unit 52, and the generation unit 54 generates an album by automatically selecting (or by urging a user to select) a template that is in accordance with the types of tags provided to the images to be inserted in the frames of the album.

For instance, when the images to be inserted in the frames of the album are provided with the tags "natural landscape" and "urban landscape", the generation unit 54 selects, from the multiple types of templates stored in the template storage unit 52, a template for landscapes.

In addition, modification may be made such that the generation unit 54 specifies decorations to be provided to the frames and in the periphery of the frames according to the tags provided to the images to be inserted in the frames. The information pertaining to such decorations may be included in the template for the album described above.

The decorations to be provided to the frames may include changes in the sizes and shapes of the frameworks of the frames as well as decorations provided to the frameworks.

The decorations to be provided in the periphery of the frames may include names of tags, symbols indicating tag types, and icons indicating tags.

For instance, the tag of the image to be inserted into frame c in FIG. 35A is "portrait". In such a case, the generation unit 54, upon the creation of an album, may (i) set the shape of frame c to an oval shape so as to match with the portrait-type image to be inserted therein, (ii) set the framework of frame c to a portrait-type picture frame, or (iii) display a character string "portrait", which indicates the name of the tag provided to the image to be inserted in frame c, in the periphery of frame c.

(2) Generation of Slideshow

The generation unit 54 generates a slideshow by using areas in images corresponding to people and the attention areas in the images.

Figure 36:
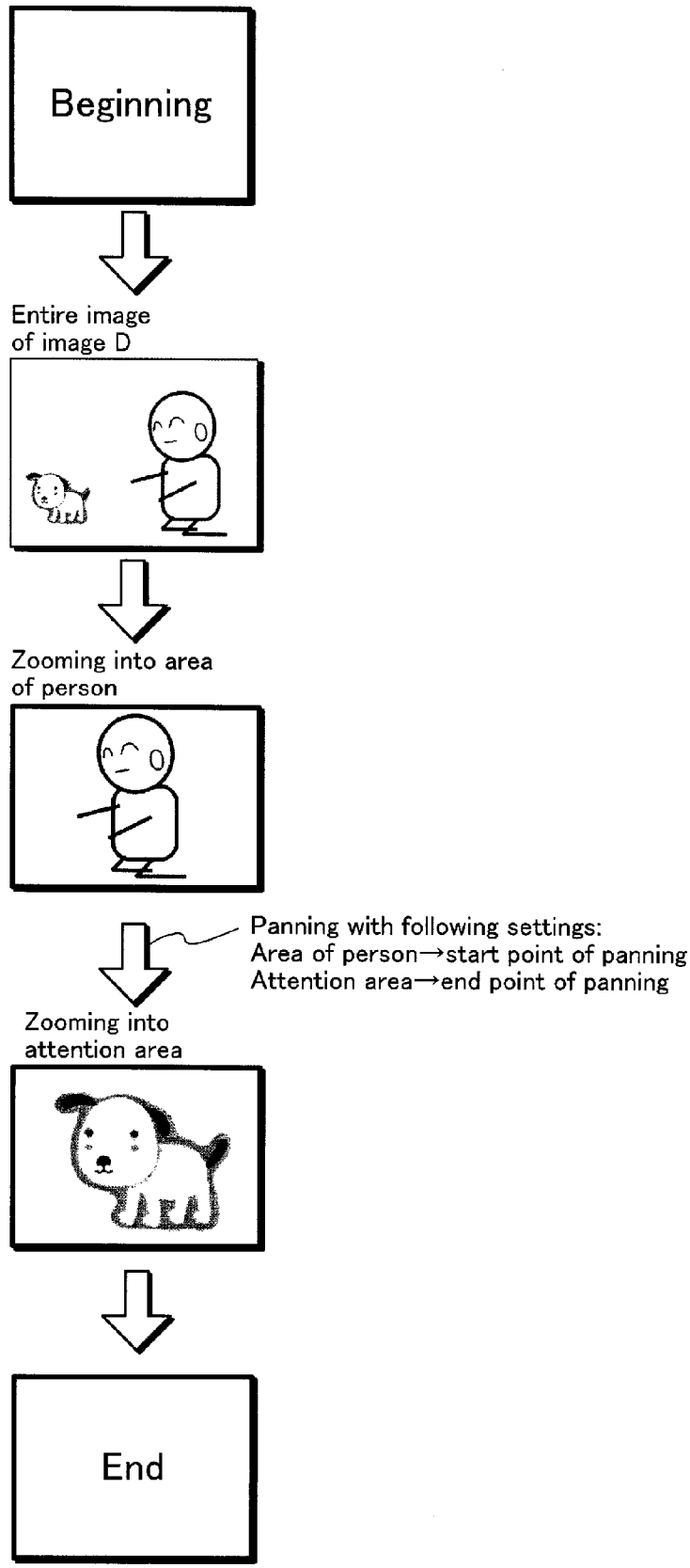
FIG. 36 illustrates an example of a slideshow.

FIG. 36 illustrates one example of a slideshow generated by the generation unit 54. In the slideshow illustrated in FIG. 36, action patterns are set that defines actions such as first zooming into an area corresponding to a person in image D, then into an attention area in image D, and subsequently panning from the area corresponding to the person to the attention area.

The present embodiment contributes in facilitating the setting of such action patterns by using an area in an image corresponding to a person appearing in the image, an attention area in the image, and the like.

The action patterns defined for a slideshow is not limited to the examples described with reference to FIG. 36, and various patterns may be set that are utilized in conventional slideshow creation applications, presentation applications, and the like.

Note that the aforementioned term "action patterns" may be referred to by using terms such as "animations" and "visual effects".

In addition, modification may be made such that templates for multiple types of slideshows are stored in the template storage unit 52, and the generation unit 54 generates a slideshow by automatically selecting (or by urging a user to select) a template that is in accordance with the tags of the images to be used in the slideshow.

For instance, since image D is provided with the "target-of-attention 3" (individual attention photograph) tag, such action patterns as panning/sliding and zooming into the attention target is suitable for image D. Accordingly, in such a case, the generation unit 54 may select a template for a slideshow including action patterns such as panning/sliding and zooming from among the multiple templates stored in the template storage unit 52.

<Modification 1>

Although description has been made in the above on embodiments of the present invention, it is to be understood that the present invention is not limited thereto. The present invention is applicable in various embodiments and modifications which are for achieving the above mentioned aim of the present invention or other aims related or associated thereto. For instance, the following modifications are construed as being within the scope and spirit of the present invention.

(1) The item "type" in the object information stored in the object information storage unit 18 and the attention vector information stored in the attention vector information storage unit 20 may be utilized as described in the following.

For instance, when an attention vector pertaining to a given image indicates the front direction, it is likely that an orientation of a person's body in the image indirectly indicates the target of attention in the image. As such, in such images, emphasis may be placed on an attention vector for an object of a person's body.

In contrast, when an attention vector pertaining to a given image indicates a direction other than the front direction, it is likely that the target of attention exists in a direction indicated by an attention vector of a person's face in the image. As such, in such images, emphasis may be placed on an attention vector of an object of a person's face and further, vector values of an attention vector of an object of a person's face may be utilized.

(2) Tags may be provided to images by extracting basic attribute information from the images and by utilizing the attribute information extracted.

One example of attribute information provided to an image is EXIF (Exchangeable Image File Format) information. More specifically, the provision of tags to images may be performed by utilizing the information defined in the EXIF information, such as photography date/time information, GPS (Global Positioning System) information, photography mode information, and other information including camera parameters set by the photographer for performing various forms of photography.

For instance, modification may be made such that the tag provision conditions according to which the provision unit 24 provides tags to images is altered such that, when it can be estimated, according to the latitude and the longitude of the GPS information for a given image, that the image has been photographed in a mountain, the image is provided with the "natural landscape" tag.

Further, modification may be made to realize a structure for extracting basic, low-order characteristic values, such as edges, colors, and textures, from images.

(3) In the creation of the total attention degree map described in embodiment 2, the creation of the total interest degree map described in embodiment 3, etc., basic characteristic values indicating characteristics of changes in the image and camera parameter information that can be obtained upon shooting of the image can be utilized.

Here, "basic characteristic values indicating characteristics of changes in the image" include information such as luminous intensity information, color information, orientation information, edge information, and texture information of the target image. Further, "camera parameter information" includes information such as focus area information, depth-of-field information, photography date/time information, photography location information, shutter speed, photographic sensitivity, white balance, and flash information.

For instance, when the time indicated by the photography date/time information indicates that a given image was photographed in the nighttime, the image may be provided with tags (e.g., nightscape, party, fireworks, etc.) having high affinity with nighttime.

(4) Prior to the provision of a tag to a target image by the provision unit 24, extraction of characteristic values from the image, matching processing of comparing and matching the image with existing model data by using the extracted characteristic values, and determination processing of determining which model data the input data matches may be performed. As the existing model data used in the above-described processing, data corresponding to common non-human objects such as dogs, cats, and cars and landscape sceneries such as the ocean and the mountains may be used.

Further, in such a case, the provision unit 24 may provide a tag to the target image by utilizing the model that is determined to match the input data in the determination processing.

(5) In the embodiments, description has been provided that the areas illustrated in FIGS. 3, 6, 10, and 11 are areas having rectangular shapes. However, the present invention is not limited to this, and the areas may have circular shapes, elliptical shapes, or polygonal shapes. Further, modification may also be made such that no limitation is imposed on the shapes of the areas, and areas are set by using pixel units in the images.

(6) In the embodiments, description has been provided that the provision unit 24 provides one image with one tag as in Step S21 in FIG. 8. However, the present invention is not limited to this, and the provision unit 24 may provide one image with multiple tags.

(7) In the embodiments, description is provided that objects corresponding to people are extracted from images. However, the present invention is not limited to this. For instance, non-human objects including pets (biological objects) such as dogs and cats, plants, architectural objects, and cars may be extracted from images. In other words, any object may be extracted from images provided that the objects are those that can be detected in images while ensuring a given degree of certainty.

As the method for extracting such objects, a method utilizing HOG (Histogram of Oriented Gradient), which indicates characteristics of shapes of objects, and other methods may be utilized.

In addition, in the extraction of such objects, characteristic value descriptors such as SIFT (Scale-Invariant Feature Transform) may also be used. SIFT is a characteristic value descriptor that expresses characteristic values of areas around a characteristic center point that is determined according to low order characteristic values such as edge, color, and texture. For details of SIFT, refer to Referenced Document 1 (Hironobu Fujiyoshi, "Gradient-Based Feature Extraction—SIFT and HOG—", Information Processing Society of Japan SIG Technical Reports CVIM 160, pp. 211-224, 2007).

(8) In the embodiments, description has been provided that, when performing the determination in Step S14, among the direction components of the attention vectors 1 and 2 illustrated in FIG. 6C, vectors $V_{O5,O6}$ and $V_{O7,O8}$ having small magnitudes are excluded from consideration. However, the present invention is not limited to this, and two vectors corresponding to faces in an image (for instance, vectors $V_{O5,O6}$ and $V_{O1,O2}$ in image A) may be combined, and determination may be performed of whether or not a direction component of the combined vector indicates the front direction. In other words, when multiple vector components exist in an image, it suffices that a vector pertaining to an entirety of the image is calculated by totaling the multiple vector components.

(9) Each of the functional blocks illustrated in FIG. 1 and the like may be implemented as an LSI (Large Scale Integration), which is a type of integrated circuit. Further, each of the functional blocks may be separately integrated into a single chip, or may be integrated into a single chip including a part or all of the functional blocks. Although description has been made on the basis of an LSI in the above, the name of the integrated circuit may differ according to the degree of integration of the chips. Other integrated circuits include an IC (integrated circuit), a system LSI, a super LSI, and an ultra LSI. Further, the method applied for forming integrated circuits is not limited to the LSI, and the present invention may be realized on a dedicated circuit or a general purpose processor. For example, the present invention may be realized on a FPGA (Field Programmable Gate Array) being an LSI which can be programmed after manufacturing, or a reconfigurable processor being a LSI, reconfiguration of which could be made to the connection of internal circuit cells and settings. Further in addition, if a new technology of circuit integration replacing that of the LSI emerges as a result of the progress made in the field of semiconductor technology or another technology deriving therefrom, the integration of function blocks may be performed applying such technology.

(10) A control program composed of program code for causing processors of various image information processing apparatuses and various circuits connected to the processors to execute the operations described in the embodiments may be distributed by recording the control program onto recording media, or by transmitting the control program via various communication paths.

Such recording media which can be used in the distribution of the control program include such non-transitory recording media as: an IC card, a hard disk, an optical disc, a flexible disk, and a ROM.

Further, the control program, once distributed, is supplied for use by being stored to a processor-readable memory or the like, and the various functions described in the embodiments are realized by the processor executing the control program.

<Modification 2>

The present invention is to be construed as including the following aspects.

(1) One aspect of the present invention is an image information processing apparatus comprising: an extraction unit that extracts an object from a photographed image; a calculation unit that calculates an orientation of the object as exhibited in the image; and a provision unit that provides a tag to the image according to the orientation of the object.

(2) In the image information processing apparatus, the calculation unit may further calculate a proportion of the image occupied by the object, and the provision unit may provide a tag to the image according to the orientation of the object or the proportion of the image occupied by the object.

According to the above-described structure of the image information processing apparatus pertaining to the present invention, the provision unit provides a tag to the image according to the orientation of the object or the proportion of the image occupied by the object. As such, a tag that is in accordance with the proportion of the image occupied by the object is provided to the image.

(3) In the image information processing apparatus, the extraction unit may extract, as the object, an area in the image including a face of a person appearing in the image or a body of a person appearing in the image, and the calculation unit may calculate the orientation of the object according to an orientation of a person's face or a person's body included in the area as exhibited in the image or a rotational tilt that a person's face or a person's body included in the area exhibits in the image and may calculate the proportion of the image occupied by the object according to a proportion of the image occupied by a person's face or a person's body included in the area.

(4) In the image information processing apparatus, the extraction unit may extract two or more objects from the image, the calculation unit may calculate, for each of the two or more objects, a vector having a direction corresponding to a direction of attention of a corresponding object in the image and a magnitude corresponding to a proportion of the image occupied by a corresponding object and may calculate a vector pertaining to an entirety of the image by combining the two or more vectors corresponding to the two or more objects, and the provision unit may provide a tag to the image according to a direction of the vector pertaining to the entirety of the image or a magnitude of the vector pertaining to the entirety of the image.

(5) In the image information processing apparatus, the provision unit may provide the image with a first tag indicating that the image is a portrait when the direction of the vector pertaining to the entirety of the image indicates a front direction in the image and may provide the image with a second tag that is different from the first tag when the direction of the vector pertaining to the entirety of the image indicates a direction in the image other than the front direction.

According to the above-described structure of the image information processing apparatus, either a first indicating that the image is a portrait or a second tag that is different from the first tag is provided to the image in accordance with the direction of the vector pertaining to the entirety of the image.

(6) In the image information processing apparatus, the provision unit may provide the image with a tag indicating that attention is directed towards a person appearing in the image when the magnitude of the vector pertaining to the entirety of the image is greater than a predetermined value and may provide the image with a tag indicating that attention is directed towards a background appearing in the image when the magnitude of the vector pertaining to the entirety of the image is equal to or smaller than the predetermined value.

(7) In the image information processing apparatus, the extraction unit may extract, from the image, one or more areas each corresponding to a person appearing in the image, each of the one or more areas including objects corresponding to a face and a body of a corresponding person, and the provision unit may perform the provision of a tag to the image such that a tag provided when only one area corresponding to a person is extracted from the image by the extraction unit differs from a tag provided when two or more areas each corresponding to a person are extracted from the image by the extraction unit.

(8) The image information processing apparatus pertaining to one aspect of the present invention may further comprise: a creation unit that creates, in the image, a first map indicating a level of attention of the object according to the orientation of the object and the proportion of the image occupied by the object; and a specification unit that specifies an area in the first map that includes a location indicating a level of attention equal to or greater than a first predetermined value.

(9) In the image information processing apparatus, the creation unit may create, in the image, a second map indicating a level of human visual attention in the image in addition to the first map, and may further create a total map indicating a combination of the level of attention indicated by the first map and the level of human visual attention indicated by the second map, and the specification unit may specify an area in the total map that includes a location indicating a level equal to or greater than a second predetermined value.

(10) In the image information processing apparatus, the second map may be a saliency map, which is based on colors, intensity, and orientations in the image.

(11) In the image information processing apparatus, the creation unit may create, in the image, a third map indicating a depth-of-field level of the image in addition to the first map, and may further create a total map indicating a combination of the level of attention indicated by the first map and the depth-of-field level indicated by the third map, and the specification unit may specify an area in the total map including a location indicating a level equal to or greater than a second predetermined value.

(12) In the image information processing apparatus, the extraction unit may extract a plurality of areas each including a person from the image, the image information processing apparatus may further comprise a selection unit that selects some of the extracted areas, among the plurality of the extracted areas, as areas to be used in the provision of a tag to the image by the provision unit, wherein the provision unit may provide a tag to the image according to an orientation in the image of a corresponding person included in each of the extracted areas selected by the selection unit or a proportion of the image occupied by a corresponding person included in each of the extracted areas selected by the selection unit.

(13) In the image information processing apparatus, the selection unit may classify, into a group, two or more of the extracted areas, among the plurality of extracted areas, according to an orientation in the image of a corresponding person included in each of the extracted areas and may select the two or more of the areas that are classified into the group as the areas to be used in the provision of a tag to the image by the provision unit.

(14) In the image information processing apparatus, the extraction unit may extract a plurality of linear segments from the image, the image information processing apparatus may further comprise a specification unit that specifies an area in the image that is located in a direction along which the plurality of linear segments converge.

(15) In the image information processing apparatus, the specification unit may define a plurality of lines by extending each of the plurality of linear segments extracted from the image and may specify an area in the image that surrounds a location in the image at which the plurality of lines cross each other.

(16) One aspect of the present invention is a method for providing an image with a tag, comprising: an extraction step of extracting an object from a photographed image; a calculation step of calculating an orientation of the object as exhibited in the image; and a provision step of providing a tag to the image according to the orientation of the object.

(17) One aspect of the present invention is a program for causing a computer to execute tag provision processing, the tag provision processing comprising: an extraction step of extracting an object from a photographed image; a calculation step of calculating an orientation of the object as exhibited in the image; and a provision step of providing a tag to the image according to the orientation of the object.

(18) One aspect of the present invention is an integrated circuit comprising: an extraction unit that extracts an object from a photographed image; a calculation unit that calculates an orientation of the object as exhibited in the image; and a provision unit that provides a tag to the image according to the orientation of the object.

REFERENCED DOCUMENT (1) Referenced Document 1
Hironobu Fujiyoshi, "Gradient-Based Feature Extraction—SIFT and HOG—", Information Processing Society of Japan SIG Technical Reports CVIM 160, pp. 211-224, 2007

The image information processing apparatus is useful for realizing provision of classification tags to images.

REFERENCE SIGNS LIST 10, 100, 102, 104, 106 image information processing apparatus
12 image storage unit
14 object extraction unit
16 calculation unit
18 object information storage unit
20 attention vector information storage unit
22 provision condition storage unit
24 provision unit
32 attention degree map creation unit
34 area setting unit
36 saliency map creation unit
38 depth-of-field map creation unit
40 detection contents determination unit
42 total interest degree map creation unit
44 classification unit
46 edge extraction unit
48 area setting unit

The invention claimed is:
1. An image information processing apparatus comprising:
a non-transitory memory that stores a program; and
a processor that executes the program and causes the image information processing apparatus to operate as:
an extraction unit that extracts one or more objects from a photographed image;
a calculation unit that calculates, according to information pertaining to each of the one or more objects, an atten- tion vector indicating attention in a photographed scene appearing in the image; and a provision unit that provides, to the image, a tag indicating a classification to which the image belongs according to a direction of the attention vector and a magnitude of the attention vector, wherein the calculation unit calculates a proportion of the image occupied by each of the one or more objects, the proportion of the image occupied being expressed as a percentage value, calculates, for each of the one or more objects, a vector having a direction corresponding to a direction of attention of a corresponding object in the image and a magnitude corresponding to the proportion of the image occupied by a corresponding object, and calculates the attention vector by using the one or more vectors corresponding to the one or more objects.

2. The image information processing apparatus of claim 1, wherein the extraction unit extracts, as an object, an area in the image including a face of a person appearing in the image or a body of a person appearing in the image, and the calculation unit calculates the direction of the vector according to an orientation of a person's face or a person's body included in the area as exhibited in the image or a rotational tilt that a person's face or a person's body included in the area exhibits in the image and calculates the magnitude of the vector according to a proportion of the image occupied by a person's face or a person's body included in the area.

3. The image information processing apparatus of claim 1, wherein the provision unit provides the image with a first tag indicating that the image is a portrait when the direction of the attention vector indicates a front direction in the image and provides the image with a second tag that is different from the first tag when the direction of the attention vector indicates a direction in the image other than the front direction.

4. The image information processing apparatus of claim 1, wherein the provision unit provides the image with a tag indicating that attention, upon shooting of the image, is directed towards a person appearing in the image when the magnitude of the attention vector is greater than a predetermined value and provides the image with a tag indicating that attention, upon shooting of the image, is directed towards a background appearing in the image when the magnitude of the attention vector is equal to or smaller than the predetermined value.

5. The image information processing apparatus of claim 1, wherein the extraction unit extracts, from the image, one or more areas each corresponding to a person appearing in the image, each of the one or more areas including objects corresponding to a face and a body of a corresponding person, and the provision unit performs the provision of a tag to the image such that a tag provided when only one area corresponding to a person is extracted from the image by the extraction unit differs from a tag provided when two or more areas each corresponding to a person are extracted from the image by the extraction unit.

6. The image information processing apparatus of claim 1 further comprising:

a creation unit that creates, in the image, a first map indicating a level of attention directed towards an area of the image upon shooting of the image according to the magnitude of the attention vector and the direction of the attention vector; and a specification unit that specifies an area in the first map that includes a location indicating a level of attention equal to or greater than a first predetermined value.

7. The image information processing apparatus of claim 6, wherein the creation unit creates, in the image, a second map indicating a level of human visual attention in the image in addition to the first map, and further creates a total map indicating a combination of the level of attention indicated by the first map and the level of human visual attention indicated by the second map, and the specification unit specifies an area in the total map that includes a location indicating a level equal to or greater than a second predetermined value.

8. The image information processing apparatus of claim 7, wherein the second map is a saliency map, which is based on colors, intensity, and orientations in the image.

9. The image information processing apparatus of claim 6, wherein the creation unit creates, in the image, a third map indicating a depth-of-field level of the image in addition to the first map, and further creates a total map indicating a combination of the level of attention indicated by the first map and the depth-of-field level indicated by the third map, and the specification unit specifies an area in the total map including a location indicating a level equal to or greater than a second predetermined value.

10. The image information processing apparatus of claim 6, wherein the extraction unit extracts a plurality of linear segments from the image, and the specification unit further specifies an area in the image that is located in a direction along which the plurality of linear segments converge.

11. The image information processing apparatus of claim 10, wherein the specification unit defines a plurality of lines by extending each of the plurality of linear segments extracted from the image and specifies an area in the image that surrounds a location in the image at which the plurality of lines cross each other.

12. The image information processing apparatus of claim 1, wherein the extraction unit extracts a plurality of areas each including a person from the image, further comprising a selection unit that selects some of the extracted areas, among the plurality of the extracted areas, as areas to be used in the provision of a tag to the image by the provision unit, wherein the provision unit provides a tag to the image according to an orientation in the image of a corresponding person included in each of the extracted areas selected by the selection unit or a proportion of the image occupied by a corresponding person included in each of the extracted areas selected by the selection unit.

13. The information processing apparatus of claim 12, wherein the selection unit classifies, into a group, two or more of the extracted areas, among the plurality of extracted areas, according to an orientation in the image of a corresponding person included in each of the extracted areas and selects the two or more of the areas that are classified into the group as the areas to be used in the provision of a tag to the image by the provision unit.

14. An image information processing method, executed by a processor, for providing an image with a tag, comprising:
an extraction step of extracting one or more objects from a photographed image;
a calculation step of calculating, according to information pertaining to each of the one or more objects, an attention vector indicating attention in a photographed scene appearing in the image; and
a provision step of providing, to the image, a tag indicating a classification to which the image belongs according to a direction of the attention vector and a magnitude of the attention vector, wherein
the calculation step
calculates a proportion of the image occupied by each of the one or more objects, the proportion of the image occupied being expressed as a percentage value,
calculates, for each of the one or more objects, a vector having a direction corresponding to a direction of attention of a corresponding object in the image and a magnitude corresponding to the proportion of the image occupied by a corresponding object, and
calculates the attention vector by using the one or more vectors corresponding to the one or more objects.

15. A non-transitory computer-readable recording medium having stored thereon an image information processing program for causing a computer to execute tag provision processing, the tag provision processing comprising:
an extraction step of extracting one or more objects from a photographed image;
a calculation step of calculating, according to information pertaining to each of the one or more objects, an attention vector indicating attention in a photographed scene appearing in the image; and
a provision step of providing, to the image, a tag indicating a classification to which the image belongs according to a direction of the attention vector and a magnitude of the attention vector, wherein
the calculation step
calculates a proportion of the image occupied by each of the one or more objects, the proportion of the image occupied being expressed as a percentage value,
calculates, for each of the one or more objects, a vector having a direction corresponding to a direction of attention of a corresponding object in the image and a magnitude corresponding to the proportion of the image occupied by a corresponding object, and
calculates the attention vector by using the one or more vectors corresponding to the one or more objects.

16. An integrated circuit comprising:
an extraction circuit that extracts one or more objects from a photographed image;
a calculation circuit that calculates, according to information pertaining to each of the one or more objects, an attention vector indicating attention in a photographed scene appearing in the image; and
a provision circuit that provides, to the image, a tag indicating a classification to which the image belongs according to a direction of the attention vector and a magnitude of the attention vector, wherein
the calculation circuit
calculates a proportion of the image occupied by each of the one or more objects, the proportion of the image occupied being expressed as a percentage value,
calculates, for each of the one or more objects, a vector having a direction corresponding to a direction of attention of a corresponding object in the image and a magnitude corresponding to the proportion of the image occupied by a corresponding object, and
calculates the attention vector by using the one or more vectors corresponding to the one or more objects.

* * * * *